United States Patent
Charlson

(10) Patent No.: US 10,694,039 B2
(45) Date of Patent: Jun. 23, 2020

(54) SYSTEM AND METHOD FOR AUTOMATED CALL DISTRIBUTION

(71) Applicant: Joseph Charlson, Pittsburgh, PA (US)

(72) Inventor: Joseph Charlson, Pittsburgh, PA (US)

( * ) Notice: Subject to any disclaimer, the term of this patent is extended or adjusted under 35 U.S.C. 154(b) by 16 days.

(21) Appl. No.: 15/687,811

(22) Filed: Aug. 28, 2017

(65) Prior Publication Data

US 2018/0013891 A1    Jan. 11, 2018

Related U.S. Application Data

(63) Continuation-in-part of application No. 15/417,603, filed on Jan. 27, 2017, which is a continuation-in-part of application No. 15/286,968, filed on Oct. 6, 2016, now Pat. No. 9,749,471, which is a continuation of application No. 15/078,442, filed on Mar. 23, 2016, now Pat. No. 9,497,323.

(Continued)

(51) Int. Cl.
| | |
|---|---|
| H04M 3/523 | (2006.01) |
| H04M 3/42 | (2006.01) |
| H04M 3/51 | (2006.01) |
| H04M 3/22 | (2006.01) |

(52) U.S. Cl.
CPC ....... *H04M 3/5232* (2013.01); *H04M 3/2281* (2013.01); *H04M 3/42008* (2013.01); *H04M 3/42042* (2013.01); *H04M 3/42059* (2013.01); *H04M 3/42221* (2013.01); *H04M 3/5141* (2013.01); *H04M 3/5158* (2013.01); *H04M 3/5166* (2013.01); *H04M 3/5175* (2013.01); *H04M 3/5183* (2013.01); *H04M 3/5231* (2013.01); *H04M 2201/40* (2013.01); *H04M 2203/2011* (2013.01); *H04M 2203/5018* (2013.01)

(58) Field of Classification Search
CPC .... H04M 3/5158; H04M 3/5183; H04M 3/51; H04M 2242/18; G06K 9/00456
See application file for complete search history.

(56) References Cited

U.S. PATENT DOCUMENTS

| | | |
|---|---|---|
| 5,809,113 A | 9/1998 | Lieuwen |
| 5,832,072 A | 11/1998 | Rozenblit |

(Continued)

OTHER PUBLICATIONS

"Siemens HiPath ProCenter Standard and Advanced Suites", Siemens Global network of innovation, 8 pp., copyright date 2003.

(Continued)

*Primary Examiner* — Nafiz E Hoque
(74) *Attorney, Agent, or Firm* — The Webb Law Firm

(57) ABSTRACT

A computer-implemented method for automating calls from a call center to a lead comprises determining, with at least one processor, a number of contact attempts based at least partially on at least one rule, determining, with at least one processor, a cadence of the number of contact attempts based at least partially on a predictive model, initiating a plurality of contact attempts based at least partially on the cadence, and ending the plurality of contact attempts in response to at least one of the following: the number of contact attempts has been met, a contact attempt is successful, the lead opted out, the lead scheduled a future contact attempt, or any combination thereof. A system and computer program product are also provided.

20 Claims, 25 Drawing Sheets

Related U.S. Application Data

(60) Provisional application No. 62/287,563, filed on Jan. 27, 2016, provisional application No. 61/970,078, filed on Mar. 25, 2014.

(56) References Cited

U.S. PATENT DOCUMENTS

| | | | |
|---|---|---|---|
| 6,012,428 | A | 2/2000 | Miloslavsky |
| 6,829,340 | B2 | 12/2004 | Wei |
| 6,850,612 | B2 | 2/2005 | Johnson et al. |
| 7,072,643 | B2 | 7/2006 | Pines et al. |
| 7,664,242 | B2 | 2/2010 | Finkelman et al. |
| 8,370,212 | B2 | 2/2013 | Asher et al. |
| 8,379,818 | B2 | 2/2013 | Arsenault et al. |
| 8,600,417 | B1 | 12/2013 | Mateer et al. |
| 8,626,612 | B2 | 1/2014 | Canning et al. |
| 8,750,847 | B2 | 6/2014 | Elie et al. |
| 8,909,198 | B1 * | 12/2014 | Trinidad ............... H04M 3/533 379/211.03 |
| 9,065,915 | B1 * | 6/2015 | Lillard .............. H04M 3/42382 |
| 9,119,138 | B2 | 8/2015 | Baluja et al. |
| 2001/0019603 | A1 | 9/2001 | McMahon |
| 2002/0120674 | A1 | 8/2002 | Son et al. |
| 2003/0198326 | A1 | 10/2003 | Wei |
| 2004/0240659 | A1 | 12/2004 | Gagle et al. |
| 2005/0038861 | A1 | 2/2005 | Lynn et al. |
| 2005/0135593 | A1 | 6/2005 | Becerra et al. |
| 2006/0250987 | A1 | 11/2006 | White et al. |
| 2008/0065402 | A1 | 3/2008 | Sanamrad |
| 2008/0089501 | A1 | 4/2008 | Benco et al. |
| 2008/0212767 | A1 | 9/2008 | Charlson |
| 2010/0106788 | A1 | 4/2010 | Lynn et al. |
| 2011/0319104 | A1 | 12/2011 | Williams |
| 2012/0218895 | A1 | 8/2012 | Bodnar |
| 2013/0060587 | A1 * | 3/2013 | Bayrak .................. G06Q 10/10 705/7.11 |
| 2014/0278953 | A1 | 9/2014 | Ismail et al. |
| 2014/0297848 | A1 | 10/2014 | Sanamrad |
| 2015/0281452 | A1 * | 10/2015 | Bohlin .................. H04M 3/523 379/266.07 |

OTHER PUBLICATIONS

"Siemens HiPath ProCenter Suites Multimedia Solutions", Siemens Global network of innovation, 4 pp., copyright date 2003.

"Connecting the world—HiPath ProCenter Portfolio", Siemens Global network of innovation, 16 pp., copyright date 2004.

"HiPath ProCenter Attendant Console", 4 pp., copyright Jun. 2006.

"Getaway! HiPath Xpressions V5.0 Advanced Unified Messaging", 6 pp., copyright 2006.

"A Comprehensive Solution Package for Managing Customer Relationships", 1 pg.

\* cited by examiner

| Call/SMS Attempt Number | Time Interval from Previous Step | Maximum Calls Attempts Per Day | Call Type and Script |
|---|---|---|---|
| | | | |
| Standard Flow | | | |
| SMS - Pre-Call Warming | Immediate (assumes Office Open) | | SMS - Pre-call warming SMS – answer rate enhancer |
| 1st Call Attempt | 1-minute | | Automated - Form Fill Outbound Attempt 1 |
| 2nd Call Attempt | 3-minutes | | Automated - Form Fill Outbound Attempt 2 |
| 3rd Call Attempt | 15-minutes | | Automated - Form Fill Outbound Attempt 3-6 |
| 4th Call Attempt | 2-hours | | Automated - Form Fill Outbound Attempt 3-6 |
| 5th Call Attempt | 2-hours | | Automated - Form Fill Outbound Attempt 3-6 |
| 6th Call Attempt | 2-hours | | Automated - Form Fill Outbound Attempt 3-6 |
| | | Day 1: 5-max call attempts, Days 2+: 4 max call attempts | |
| Standard Flow (continued) | | | |
| SMS - Sorry We Missed You | Upon call attempt 6 failure to connect | | SMS - Sorry We Missed You |
| 7th Call Attempt | 3-hours | | Automated - Form Fill Outbound Attempts 7-13 |
| 8th Call Attempt | 3-hours | | Automated - Form Fill Outbound Attempts 7-13 |
| 9th Call Attempt | 3-hours | | Automated - Form Fill Outbound Attempts 7-13 |
| 10th Call Attempt | 3-hours | | Automated - Form Fill Outbound Attempts 7-13 |
| 11th Call Attempt | 3-hours | | Automated - Form Fill Outbound Attempts 7-13 |
| 12th Call Attempt | 3-hours | | Automated - Form Fill Outbound Attempts 7-13 |
| 13th Call Attempt | 3-hours | | Automated - Form Fill Outbound Attempts 7-13 |

FIG. 15A

| Afterhours Events - Form Fill and Inbound Calls arriving when the Office is closed ||||
|---|---|---|---|
| SMS - After-Hours | Immediate | | Afterhours Welcome SMS |
| After Hours Inbound Caller Greeting | Immediately Presented to Caller | | Afterhours greeting |
| After Hours - 1st Call Attempt | As soon as office reopens subject to concurrency limits and sweeper rate controls | | Automated - Afterhours Script Attempt 1 |
| After Hours - 2nd Call Attempt | 3-minutes - if fails moves back to appropriate Standard Flow call attempt step | | Automated - Afterhours Script Attempt 2 |
| SMS - After-Hours Failure to Connect | Upon call attempt 5 failure to connect | | Afterhours - We've been trying to reach you SMS |
| | If fails to connect, lead moves back to appropriate Standard Flow call attempt step | | |
| Courtesy Callbacks to Inbound Hang-ups & Calls to Buyer 0-30 sec ||||
| SMS Pre-call Warming | Immediate | | Pre-Call Warming SMS |
| Courtesy Callback 1st Call Attempt | 2-minute | | Automated - Courtesy Call Back Attempt 1 |
| Courtesy Callback 2nd Call Attempt | 3-minutes | | Automated - Courtesy Call Back Attempt 2 |
| | If fails to connect, lead moves back to appropriate Standard Flow call attempt step | | |
| | | | |
| Reengagement->Courtesy Callbacks to Callers who are connected to buyer for less than X seconds where X is less than Qualfication Time, e.g. <30 seconds when 60 seconds is qualification time ||||
| Reengagement Callback 1st Call Attempt | 10-minutes | | Automated - Courtesy Call Back Attempt 1 |
| Reengag3ment Callback 2nd Call Attempt | 15-minutes | | Automated - Courtesy Call Back Attempt 2 |
| | If fails to connect, lead moves back to appropriate Standard Flow call attempt step | | |
| | | | |
| *** Daybreaks will vary by lead based on time lead generated and affect the timing intervals between steps that spans office days *** ||||

FIG. 15B

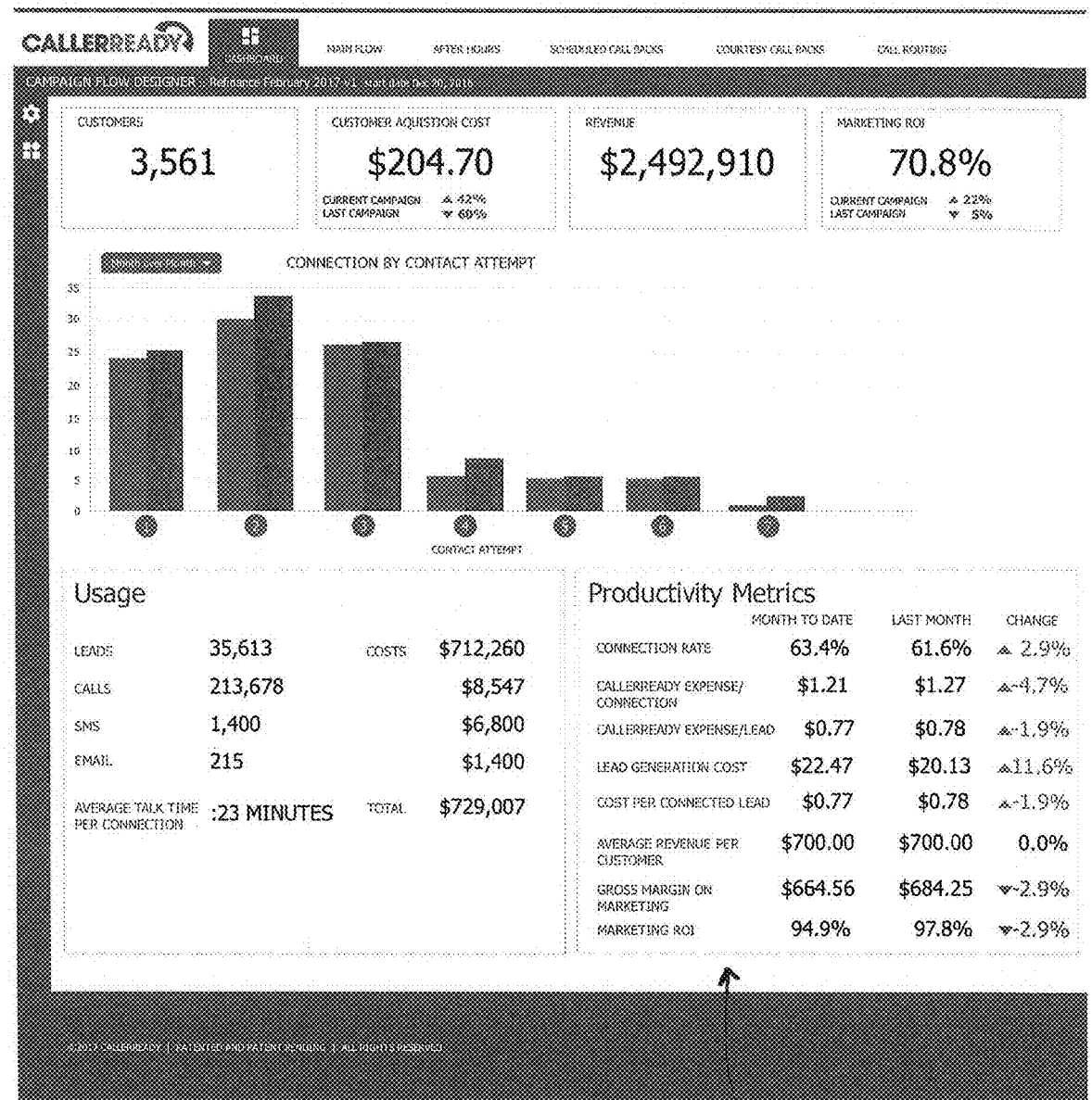
FIG. 16 — 1600

FIG. 25    2500

SYSTEM AND METHOD FOR AUTOMATED CALL DISTRIBUTION

CROSS REFERENCE TO RELATED APPLICATIONS

This application claims priority to and is a continuation-in-part of U.S. patent application Ser. No. 15/417,603, filed Jan. 27, 2017, entitled "System, Method, and Apparatus for Determining a Status of a Call Recipient in a Call System," which claims the benefit of priority to U.S. Provisional Application No. 62/287,563, filed on Jan. 27, 2016, the entire contents of which are hereby incorporated by reference, and as a continuation-in-part of U.S. patent application Ser. No. 15/286,968, filed Oct. 6, 2016, now U.S. Pat. No. 9,749,471, entitled "System and Method for Call Distribution," which is a continuation of U.S. patent application Ser. No. 15/078,442, filed Mar. 23, 2016, now U.S. Pat. No. 9,497,323, entitled "System and Method for Call Distribution," which claims the benefit of priority to U.S. Provisional Application No. 61/970,078, filed Mar. 25, 2014, entitled "System and Method of Call Distribution," the entire disclosures of which are also herein incorporated in their entirety by reference.

BACKGROUND OF THE INVENTION

Field of the Invention

The present invention relates to the distribution of a telephone call across multiple buyers or agents. In particular, non-limiting embodiments of the invention apply to sales organizations where calls are distributed to multiple buyers or agents.

Description of the Related Art

When a customer calls into a telephone number seeking a potential service provider (e.g., call-buyer) either through direct dial or brokered by a warm call transfer agent or transferred 'blind' by an agent without any third-party warm introduction, speed is of the essence in terms of decreasing customer hold times and helping to foster a positive emotional state in the mind of the caller. Being able to call out to multiple potential buyers in a near simultaneous manner, staggered manner, or prioritized manner is important. This applies both across competing customers within the same service category, as well as within a company across multiple competing sales agents. In both situations, people are competing to speak with the caller. If everyone were to receive the caller's phone number, everyone would have sufficient information to contact the customer and the value of the caller's information is therefore diminished by the act of transmitting their phone number. Current call marketplace technology is set up for single buyer distribution, or if multiple potential buyers are involved, those systems will sequentially call one call-buyer at a time to try to control the distribution of information and related reduction of value as caller information is presented to multiple buyers. If the caller information is not disclosed, a static or constant number is used in place of all callers' telephone numbers for a given marketing campaign and this same static number is displayed to all competing buyers or competing agents for all calls facilitated on the marketing campaign. When a competing buyer requires geographical information that is normally conveyed by a caller's telephone number to properly route calls, these static or constant phone number calls typically must be connected in a staged method wherein a receptionist or call screening person must answer the call to then properly route the call internally with the buyer organization.

A type of call may be either: i) a "live transfer"/"warm call transfer," meaning a call transferred by a call center agent who introduces the caller to a different agent before dropping off the call; ii) a directly-dialed consumer call, where the caller dials the number and is directly connected to the sales agent; or iii) a "blind transfer" meaning a call transferred by a call center agent into an additional call distribution path without providing any introduction between the caller and the receiving agent. In these types of calls, call suppliers/generators typically will pass one of the following options as the caller identification (Caller ID) telephone number:

Actual Caller ID Number of the Caller: The caller's telephone number is transmitted directly as-is. This is the most common occurrence for a call that is initiated directly by a consumer dialing into an advertised telephone number that is directly connected with an advertiser.

Alternative Caller ID: Advertising Campaign Specific Phone number—a static caller ID number such as 800-555-1234 that represents the specific advertised phone number (advertising campaign phone number); Fixed Caller ID Number Mask—a static telephone number used for a grouping of calls or advertising campaigns, e.g., a fixed caller ID number used by a warm call transfer call center for all or a designated category or group of their transfers; and Restricted or Blank Caller ID—the caller ID phone number is blank and may show Restricted as the caller ID name.

Several key limitations exist with the current state of caller ID transmission relating to the selling of phone calls across multiple competing call-buyers. Once a consumer's telephone number is displayed to a prospective call-buyer's telephone or telephone system, a record of that call attempt exists in the prospective call-buyer's telephone system call log. Therefore, the indication of interest and the means of contacting that consumer have been transmitted to the prospective call-buyer even if the prospective call-buyer does not answer the phone or answers the phone but does not press a key to accept the call. For example, if the call is offered to five (5) buyers, and is awarded and sold to one (1) of those five (5) buyers, the non-winning four (4) buyers have received the expression of interest from this consumer and the means of contacting the caller outside of the call supplier's call tracking system, therefore diluting the value to the "awarded" buyer who purchased the call and preventing the call supplier from monetizing the follow-up callbacks the four (4) non-winning buyers may make to the caller outside of the call supplier's call tracking system.

If instead, the call supplier offers the call to only a single buyer or agent, then the caller is subjected to potentially long hold times or will be passed into voicemail. The shorter the hold time prior to connecting two parties, the higher the connection success rate, as defined by two parties engaged in conversation. The longer the hold time prior to connecting two parties, the lower the connection success rate. With longer hold times, the dropped call percentage increases as consumers who grow weary hang-up prior to being connected. Consumers who are connected faster are also in a better emotional state than those who wait on hold for a long time. Consumers who wait a long time on hold become fatigued and are less likely to engage in a productive sales conversation.

Another approach to solve for the dissemination of the consumer's expression of interest and the means of contacting the consumer is to use a static Alternative Caller ID telephone number. Several limitations of this approach exist. Call Reconciliation Accounting: The call-buyer does not have a straightforward means of discussing specific calls with the call supplier because multiple calls on the call-buyer's call log share the same alternative caller ID number. This makes reconciliation of qualified call counts and the discussion and follow-up transactions related to the specific calls and the set of calls inordinately difficult. Further, when you want to allow multiple buyers to compete for the call, e.g., speed to press a key competitions, the problem of tracking activity becomes compounded. Call Geographic Distribution: If the call-buyer depends on using geography of the caller's telephone number, e.g., the area code, for the purpose of automated call distribution/routing to different geographically disparate sales offices or agents, the static caller ID alternative approach does not transmit any information about the geography of the caller.

SUMMARY OF THE INVENTION

Accordingly, and generally, it is the object of the present invention to provide improved systems and methods for call distribution.

In one preferred and non-limiting embodiment of the present invention, provided is a caller identification masking system that disaggregates the caller's unique telephone number from related important pieces of information used to track and geographically distribute the call. By doing so, calls can now be offered to multiple competing buyers or competing agents more freely so the lead time to find an available matching buyer or agent and connect that buyer or agent to the caller is greatly reduced.

According to a non-limiting embodiment, provided is a computer-implemented method for automating calls from a call center to a lead, comprising: determining, with at least one processor, a number of contact attempts based at least partially on at least one rule; determining, with at least one processor, a cadence of the number of contact attempts based at least partially on a predictive model; initiating a plurality of contact attempts based at least partially on the cadence; and ending the plurality of contact attempts in response to at least one of the following: the number of contact attempts has been met, a contact attempt is successful, the lead opted out, the lead scheduled a future contact attempt, or any combination thereof.

According to another non-limiting embodiment, provided is a system for automating calls from a call center to a lead, comprising at least one processor programmed or configured to: determine a number of contact attempts based at least partially on at least one rule; determine a cadence of the number of contact attempts based at least partially on a predictive model; initiate a plurality of contact attempts based at least partially on the cadence; and end the plurality of contact attempts in response to at least one of the following: the number of contact attempts has been met, a contact attempt is successful, the lead opted out, the lead scheduled a future contact attempt, or any combination thereof.

According to a further non-limiting embodiment, provided is a computer program product for automating calls from a call center to a lead, comprising at least one non-transitory computer-readable medium including program instructions that, when executed by at least one processor, cause the at least one processor to: determine a number of contact attempts based at least partially on at least one rule; determine a cadence of the number of contact attempts based at least partially on a predictive model; initiate a plurality of contact attempts based at least partially on the cadence; end the plurality of contact attempts in response to at least one of the following: the number of contact attempts has been met, a contact attempt is successful, the lead opted out, the lead scheduled a future contact attempt, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

FIGS. 15A and 15B show schedule tables for a system and method for automating a plurality of contact attempts for a lead according to non-limiting embodiments;

FIG. 16 shows a dashboard GUI 1600 including the results of a lead-to-call automation campaign according to non-limiting embodiments;

DETAILED DESCRIPTION OF THE INVENTION

Figure 1A:
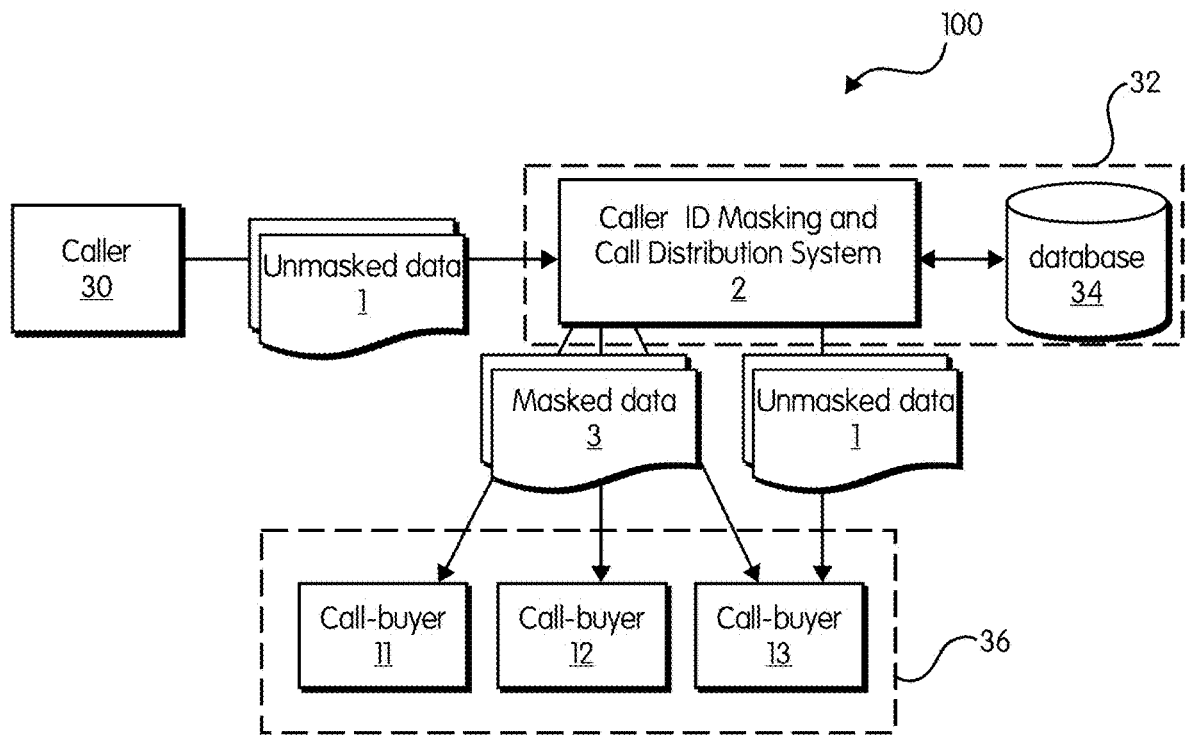
FIG. 1A is a diagram showing a telecommunications system according to non-limiting embodiments.

As used herein, the terms "communication" and "communicate" refer to the receipt or transfer of one or more signals, messages, calls, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

In preferred and non-limiting embodiments, provided are methods of improving the connection success rate and decreasing the hold time on inbound calls from prospective clients into sales organizations, for both direct client-dialed calls and for both blind call transfer-style and warm call transfer-style calls originated by call center qualification and transfer agents. Non-limiting embodiments involve the use of call routing, caller ID telephone numbers, passing data along with telephone calls, call-seller protection through caller identity management, non-exclusive rate-shopping to exclude previously sold buyers from the distribution pool, exclusive buyer protection mode, and multi-buyer distribution. Multi-buyer distribution with "speed to press 1", speed to keypress, speed to answer, or similar competitions decrease hold times, improve the connection success rate, and improve the emotional character of the exchange between the customer and the awarded sales or customer service person. Non-limiting embodiments of the present invention also relate to additional features pertaining to call scheduling, automated facilitation of said scheduled calls, and advances in intelligent abandonment through automated call queuing.

Referring now to a preferred and non-limiting embodiment of the invention, provided is a caller identification masking system that enables a call-supplier to offer a call to one or more competing call-buyers by using a unique caller ID mask for each call or for each caller. The caller's actual telephone number is withheld from the potential call-buyers at the time when the call is offered to them. Therefore, if the call-buyers do not accept the call and/or are not awarded the call, they have no means of contacting the caller outside of the call supplier's call distribution system. The actual contact information is withheld until either a viable connection or a sale of the call occurs. The resulting unique caller ID telephone number mask becomes a unique identifier for the call or caller in the initial data transactions between the call-supplier's call distribution system and the call logging and related tracking systems of the potential call-buyers and the awarded call-buyer.

Referring now to FIG. 1A, a telecommunications system 100 is shown according to a preferred and non-limiting embodiment. A caller 30 may be an individual or entity that is calling a telephone number hosted by the platform 32. The platform 32 may include one or more computers and databases for receiving and distributing telephone calls from callers 30 to a pool 36 of one or more potential call-buyers. For example, the platform 32 may include a caller ID telephone number masking and call distribution system 2, including one or more computers, including memory, processors, and/or the like, and software applications programmed or configured to receive a signal that a telephone call is received, and process information relating to the telephone call. The caller ID masking and call distribution system 2 may be in one location or, in other embodiments, the components may be distributed in different locations. The caller ID telephone number masking and call distribution system 2 may be in communication with a database 34 including caller ID information, unmasked data matched with corresponding masked data or identifiers, or other like data useful for implementing the telecommunications system 100.

With continued reference to FIG. 1A, the telephone call initiated by the caller 30 may include unmasked data 1, or such data 1 may be provided by a service provider, identifying the caller 30. This caller ID information may include a telephone number, name, address, and/or any other identifying information that is transmitted from the caller 30 or is otherwise available through a service provider. Caller ID information may also be looked up in third-party databases once at least a portion of such information can be identified. The caller ID masking and call distribution system 2 receives the identifying data 1 and processes it to generate masked data 3. The masked data 3 is transmitted to a plurality of competing call-buyers 11, 12, 13. The system 2 may then determine which call-buyer to award the telephone call to, and provide the unmasked data 1, or at least a portion thereof, to the call-buyer 13 awarded the call. It will be appreciated that, in some embodiments, the masked data 3 may include the unmasked data 1 in an encrypted or otherwise concealed form. In other embodiments, the identifying data that is masked is stored on a database 34 and must be retrieved and separately provided to the call-buyer 13 awarded the call.

As used herein, the term "telephone call" may refer to any voice communication initiated over a telecommunications network including, for example, plain old telephone service (POTS), voice-over-IP (VOIP), and other like communication methods. It will be appreciated that various means of audio communication may be utilized.

The unique caller ID mask may act as a key that is used to update the call-buyer's systems of record at the appropriate times with the real contact information and any associated meta-data that is collected prior to the call connection. In one non-limiting embodiment, the caller ID name cannot be identified by the prospective call-buyers because they do not have the actual caller's telephone number. The caller's actual telephone number is only presented to the specific call-buyer or agent who is awarded the call, i.e., gets connected to the caller, either at the time the connection/award occurs or at later time once a call duration milestone has been reached, e.g., when the call connection duration reaches a specified or predetermined duration (for example, "X" seconds) indicating that a qualified call has occurred and the related billable/sale event has occurred.

As used herein, the terms "call-buyer," "call-buyers," "service provider," and "service providers" may refer to any entity or agent that purchases phone calls for non-branded category phone calls, or brand-specific or company-specific advertisement phone calls. Non-branded category phone calls may include calls from consumers seeking insurance, tax debt resolution, student loan consolidation, mortgage refinances, reverse mortgages, education, solar power, social security disability representation, plumbing, flooring, home security systems, psychic services, life insurance, auto insurance, medical insurance, other insurance, assorted legal services, and/or the like, in response to category advertisements as opposed to company-specific advertisements, which are offered to competing providers of the given product or service. These competing providers may be pre-approved participants meeting minimum quality ratings thereby comprising a curated list by the call-seller or network owner. Further the competing service providers may be selected by the caller online or via designation through interactive voice response on the call. Brand-specific or company-specific advertisement phone calls may be offered to multiple competing salespeople who are all representatives of the same brand.

The source of the phone calls can be, for example, consumer initiated inbound calls to an advertised number, automated outbound calls with prerecorded messages, warm call transfers, and blind transfers. Automated outbound calls with prerecorded messages may involve the lead pressing "1" or some other key or sequence to be connected with a call-buyer, after which the call-buyer competition is staged. Warm call transfers may occur when a consumer and a transfer agent connect to a call-buyer, and the transfer agent introduces the consumer to the call-buyer. Blind transfers may occur where a transfer agent qualifies and passes consumers into a competition, where the consumer is then directly connected to the awarded call-buyer without any introduction from the transfer agent.

When a call is being offered to multiple competing call-buyers, the call-supplier may add a telephone keypad key-press requirement in order to award the call to a live person (e.g., a "With Verify" mode, as opposed to a "No Verify" mode that does not have such a requirement). Doing so avoids transferring the caller into a specific call-buyer's telephone routing system hold queue or their voicemail answering system.

The telephone number can be masked using any number of algorithms and methods. The telephone number may be represented as a string, integer, multi-character array, or in any other type of data structure. The telephone number can then be processed by an algorithm that manipulates some or all of the digits and/or characters, generating masked caller ID information. Those skilled in the art will appreciate that such algorithms may be implemented in various ways.

When potential call-buyers need information about the geographic location of a caller (i.e., city, state, or zip code) to correctly route the call to the appropriate sales office, service office, or licensed broker, call-buyers typically depend on the using the caller's phone number within their internal call distribution mechanism (commonly referred to as an ACD or Automatic Call Distributer). Therefore, in these situations, restricting the caller ID telephone number, using a static caller ID telephone number, or otherwise preventing the transmission of the identity of the caller, can prove troublesome. In non-limiting embodiments, the call-seller can preserve the area code of the caller origin. Furthermore the call-seller can preserve the area code and 3-digit telephone number prefix or exchange of the caller's actual telephone number.

Non-limiting embodiments of the present invention enable new ways of selling phone calls by call-sellers to call-buyers by allowing simultaneous and overlapping call-seeks or queries to be made to multiple potential call-buyers' phones and phone systems using a unique caller ID telephone number that provides sufficient information for call tracking, call logging, and unique leads being created in lead management and customer relationship management (CRM) systems, but without sharing of the highly valuable unique identifying contact information of the caller until it is supposed to be shared either at the moment of call award/connection or the moment of sale. Non-limiting embodiments of the present invention also provide for a method of transmitting sufficient information for call tracking, reconciliation, and dispute resolution. Further, non-limiting embodiments may provide for the asynchronous unmarking/updating of the correct lead record in multiple call and lead tracking systems.

Being able to poll multiple competing call-buyers or agents for availability and acceptance of the call brings at least two important and related advantages: being able to connect a caller to a sales or service agent much faster leading to higher overall connection rates stemming from fewer calls dropped by consumers who grow weary and hang-up prior to being connected; and better quality conversations leading to higher sales from consumers who are connected faster because they are in a better emotional state than those who wait on hold for a long time.

In a non-limiting embodiment, the area code of the caller's telephone number is preserved followed by a 7-digit lead identification number, a 0+6-digit lead identification number, or the like. Moreover, the area code may be identified and obtained from matching lead data but might be different from the caller's telephone number. For example, if the caller is calling about refinancing his property in Pittsburgh, Pa., but his phone number is associated with a New Jersey area code, the system may match the caller to the customer's data record, but use an area code associated with said property, such that the call can be properly routed to state licensed hunt groups within a pool of potential call-buyers. Additionally, the area code can trigger the correct display of the caller's general geography on the recipient's phone system or the city/state and zip can be accurately transmitted using a data protocol to a web or softphone, or to a hardware phone using the Session Initiation Protocol (SIP).

Figure 1B:
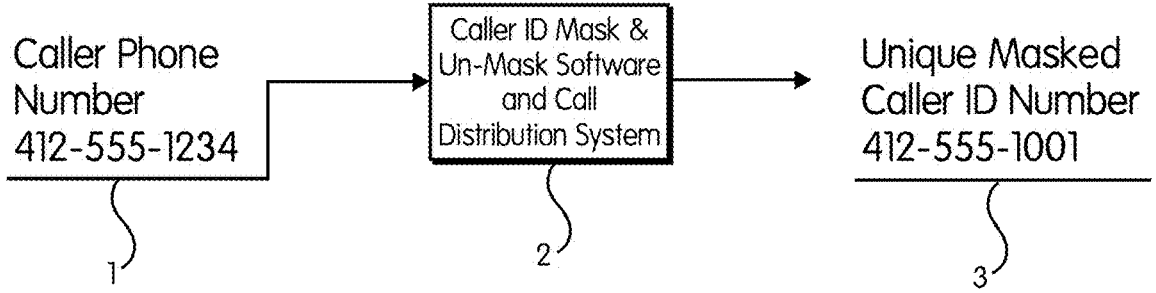
FIG. 1B is a diagram showing the caller's phone number coming into the system and being assigned a unique masked caller ID number, wherein the area code and telephone number prefix or exchange of the caller's phone number is preserved, according to non-limiting embodiments.
Figure 1C:
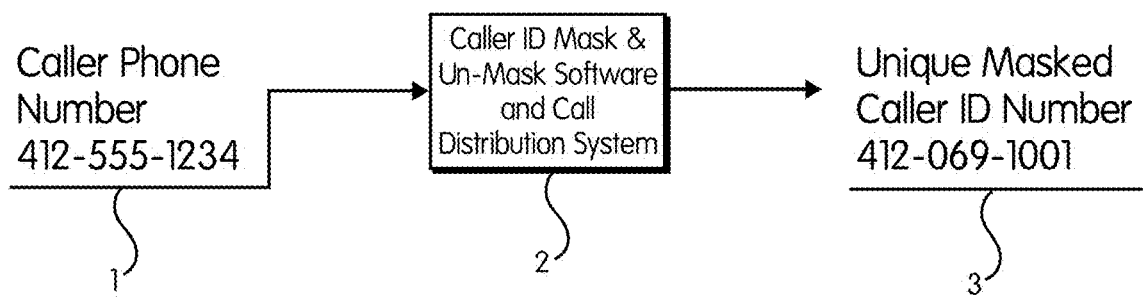
FIG. 1C is a diagram showing the caller's phone number coming into the system and being assigned a unique masked caller ID number, wherein the area code of the caller's phone number is preserved, according to non-limiting embodiments.

As shown in FIG. 1C, and according to a preferred and non-limiting embodiment, the caller's phone number 1 is transmitted into the caller ID masking and call distribution system 2 and, based on this data, the unique caller ID mask 3 is generated. In non-limiting examples, the caller ID masking and call distribution system 2 may include one or more computers running one or more software applications. The various components of the system 2 may be located together or distributed remotely. For example, caller ID masking software may execute on one or more computers and be programmed or configured to accept an unmasked number and output a masked number, or to accept a masked number and output an unmasked number. The system 2 may also include one or more databases including an index of masked and related unmasked numbers, a call distribution system, and other hardware and/or software components.

With continued reference to FIG. 1C, the area code of the caller's telephone number 1 (e.g., "412") is preserved in the resulting caller ID mask 3. The caller ID mask 3 can be configured in this way to communicate the caller's area code so that the potential call buyers can internally route the call based on geography and apply the 7-digit mask to the remaining numbers. The seven digits may use a sequential integer derived from an internal lead identification number that identifies the unique call in the caller ID masking and call distribution system 2. The seven digits provide 9.9-million unique numbers before repeating within an area code and as such should suffice for all practicable lead reconciliation needs. Alternately, a static area code may be used and followed by a 7-digit lead identification number.

Referring to FIG. 1B, and according to a non-limiting embodiment, the area code and the telephone number prefix or exchange may be preserved from the caller's phone number 1 after being processed by the caller ID masking and call distribution system 2. As shown, the unique caller ID mask 3 may include an identifier for the last four digits, and the original area code and telephone number prefix or exchange of the telephone number 1.

In non-limiting embodiments, additional or fewer digits may be masked. For example, only the last four (4) digits may be masked, preserving the first six (6) digits including the area code and the telephone number prefix or exchange (e.g., "412-555"). The telephone number prefix or exchange (e.g., "555") may be used to specify an additional level of geographic area or region specificity for use in geo-routing by call-buyers. Further, certain telephone carriers may experience difficulties with a telephone number prefix or exchange that begins with a zero (0), which may be the case when using a 7-digit lead identification number (e.g., 412-0XX-XXXX). This may cause certain telephone carriers to block these numbers as non-callable numbers.

The advantages of the call distribution system include, without limitation and as an example, the withholding of the caller's contact information until a viable connection or sale of said phone call occurs. Fewer calls are wasted on call-buyers who are not prepared to receive the call, and the call can be beneficially routed to an available call-buyer. This increase in the call supplier's connection rate and reduction of disputes over failed connections and rejected calls makes the call selling process more efficient and has the potential to lower the price of the calls for the call-buyers. These unique masked caller ID telephone number features of non-limiting embodiments of the present invention maintain the benefits of call tracking systems and the associated data integrations between call routing systems and lead management systems and customer relationship management (CRM) systems. The unique caller ID mask provides the key between the systems and this key can then be used to update the call-buyers' systems of record at the appropriate times with the real contact information and any associated metadata that has been collected prior to the call connection.

Figure 2:
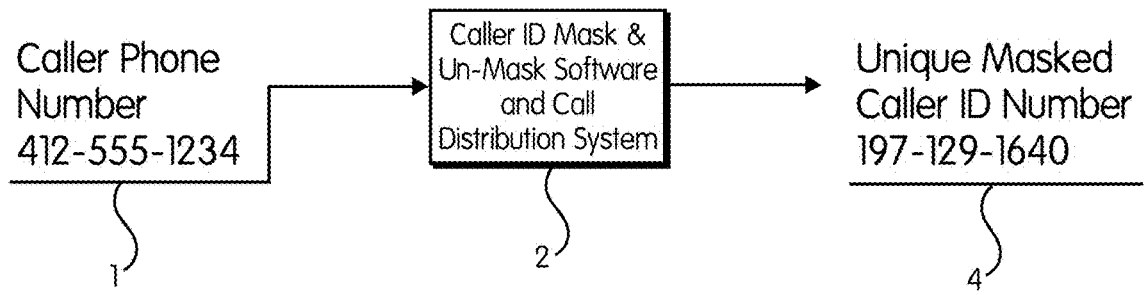
FIG. 2 is a diagram of the system, wherein the area code of the caller's number is not preserved, according to non-limiting embodiments.

As shown in the non-limiting embodiment depicted in FIG. 2, the caller ID mask 4 may use the entire 10-digit integer (for U.S. telephone numbers). This embodiment yields 9.9-billion unique numbers before repeating.

Figure 3:
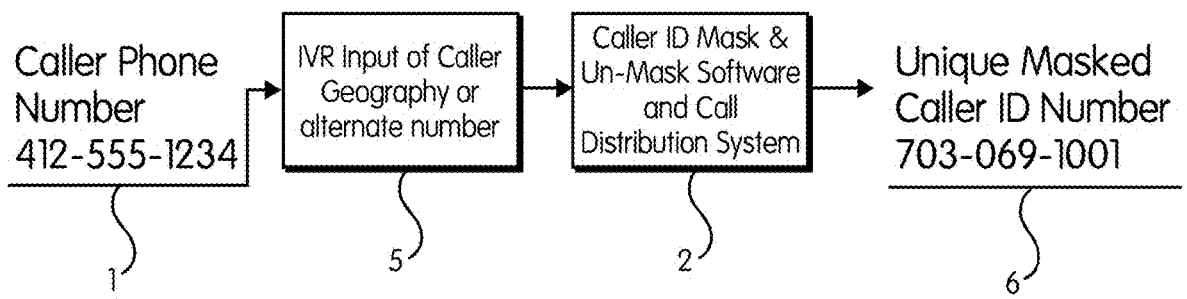
FIG. 3 is a diagram of the system, wherein an interactive voice response prompt is provided to the caller or to a transfer agent before proceeding into the caller ID masking process, according to non-limiting embodiments.

In FIG. 3, an interactive voice response (IVR) menu 5 is presented to the caller or to a call transfer agent before proceeding into the caller ID masking and call distribution system 2. The IVR menu 5 can be used to accept the caller's telephone number and then apply the caller identification masking system to the entered number. Further still, the IVR menu 5 can be used to gather a geographic code, such as a zip code or state, and use this entered information to select the appropriate area code or correct area code and telephone number prefix or exchange to use in the formulation of the unique caller ID mask. In FIG. 3, the unique caller ID mask 6 has a different area code that was entered in the IVR menu 5.

Figure 4:
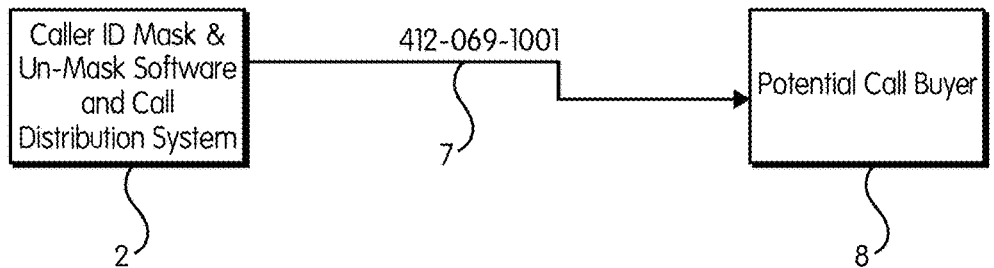
FIG. 4 is a diagram of the system that shows the masked caller ID being presented to a potential call-buyer or agent's telephone or telephone call routing system, according to non-limiting embodiments.

FIG. 4 shows the call distribution system 2 transmitting the caller ID mask 7 to a potential call-buyer's phone or automated call distributor 8 according to a non-limiting embodiment.

Figure 5:
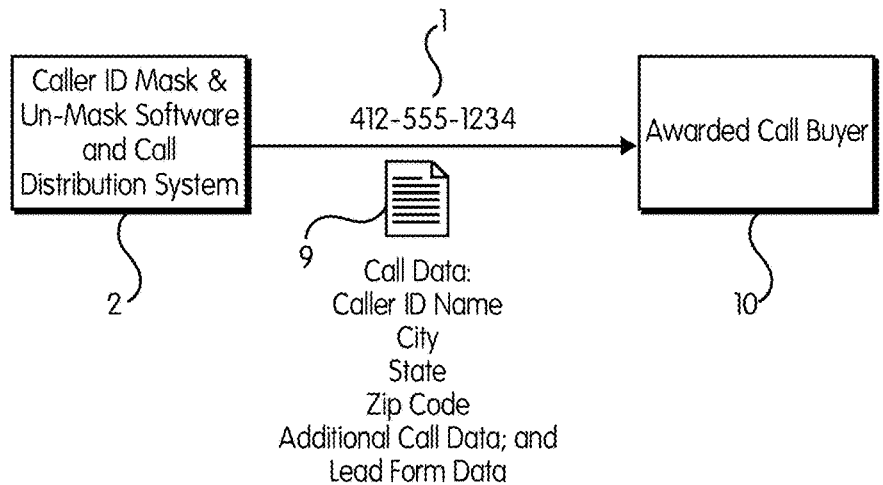
FIG. 5 is a diagram of the system performing the un-mask operation, revealing the true phone number of the caller and associated data, according to non-limiting embodiments.

FIG. 5 shows the call distribution system 2 performing the un-mask/data reveal operation according to a preferred and non-limiting embodiment. The caller ID masking and call distribution system 2 presents the caller's true information containing the caller's actual phone number 1, and related identifying call information and lead form information 9 (e.g., caller ID name, city, state, and zip code where the phone number is registered, call duration (once the call has ended), a link to the call recording, lead contact information with full address, alternate numbers, and answers to qualifying questions that may have been captured through an online self-service form, through an IVR (interactive voice response menu system), or by a call center agent), to the awarded buyer 10.

In non-limiting embodiments, when a call-buyer is awarded a call (e.g., at the time of the award), or when the call duration threshold for a qualified call sale occurs (e.g., at the time of the sale), the caller ID number and any associated identifying data, e.g., caller ID name, and the city, state and/or zip code where the caller's telephone number is registered, etc., can be unmasked in several ways. The process of unmasking the caller's identifying information includes, but is not limited to:

1. Via an electronic post into the buyer's customer relationship management software, lead management software, or other related tracking system, such as Google Analytics™ at the time of award or at the time of sale;

2. Via email transmission;

3. Via SMS text transmission;

4. Via an electronic update post, wherein the initial post at the time of award can be made using the masked number to create the lead record in the buyer's CRM and then this lead record can be updated with the actual caller's identifying information at the moment when the call duration reaches the qualified call duration threshold;

5. Via update messaging to the buyer's web browser phone, soft-phone, or SIP phone to update the phone's display;

6. At the moment of award before connecting the call, the telephone number can be spoken to the buyer/agent using text-to-speech; and/or 7. Via a screen pop-up dialog box within the buyer's CRM, by opening a new browser tab or updating a browser web frame within an existing tab or triggering a pop-up, modal lightbox, or the like.

Figure 6:
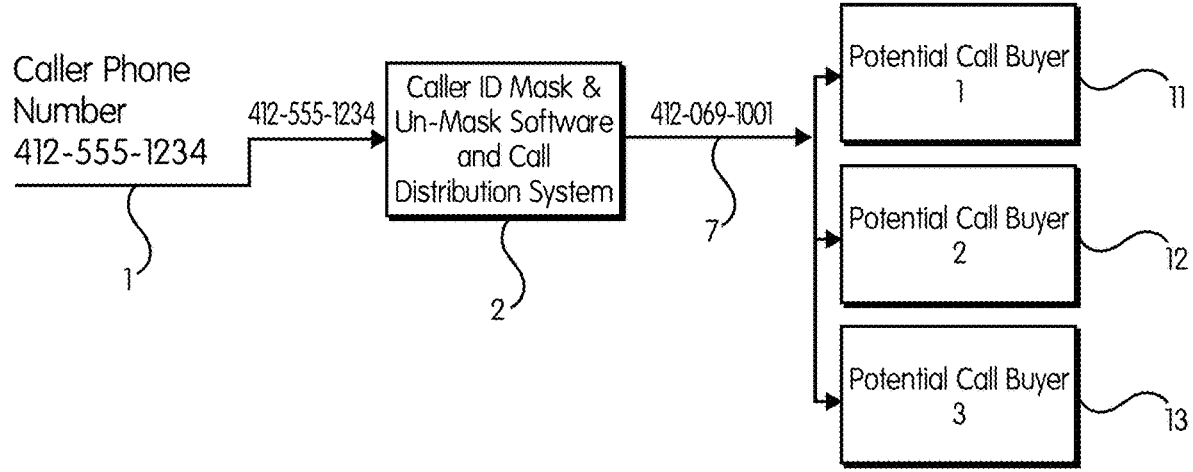
FIG. 6 is a diagram of the system, wherein multiple potential call-buyers or agents are offered a call at the same time and all of the potential call-buyers are presented with the unique masked caller ID number, according to non-limiting embodiments.

FIG. 6 illustrates a non-limiting embodiment in which the caller ID masking system and call distribution system 2 is used to offer a single call to multiple competing call-buyers, typically from different organizations, Potential Call-Buyer One 11, Potential Call-Buyer Two 12 and Potential Call-Buyer Three 13. Each of these call-buyers 11, 12, 13 is presented with the masked caller ID 7 number. This embodiment is also applicable with competing sales agents within a single organization. In a non-limiting embodiment, the caller ID mask may be presented to only some of the competing call-buyers while the actual caller's telephone number may be presented to one or more call-buyers to accommodate system limitations for updating call lead records for said buyers.

Figure 7:
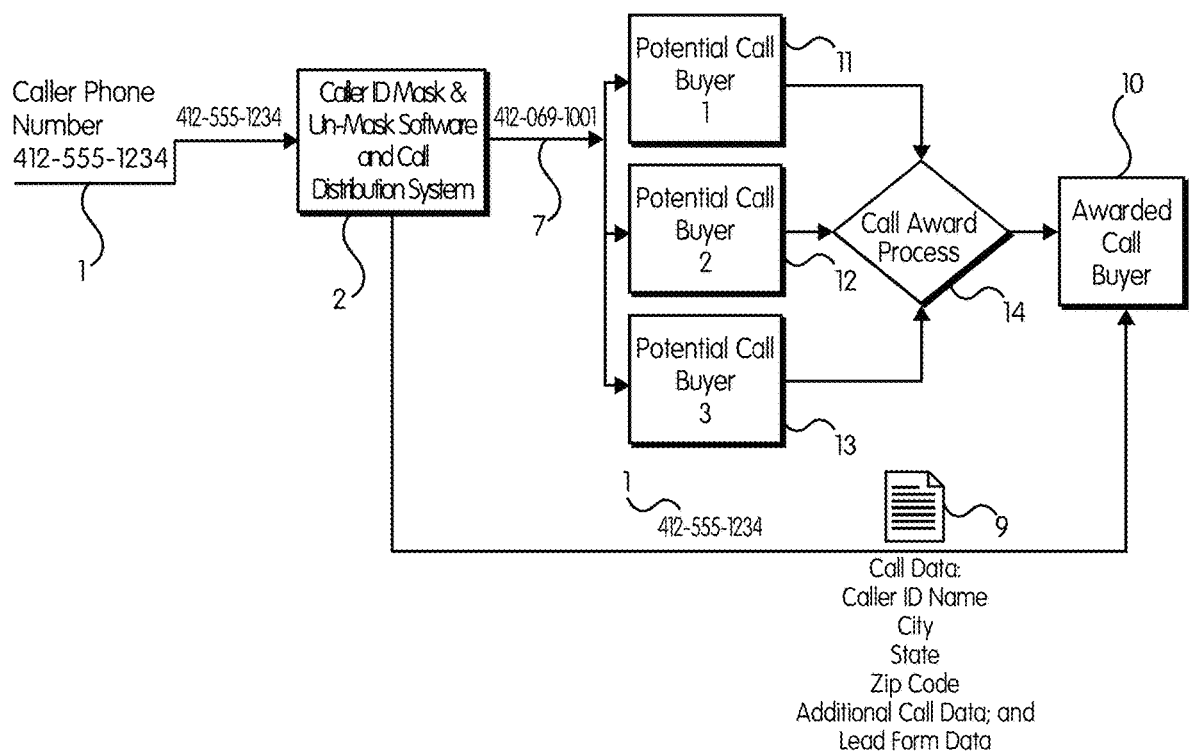
FIG. 7 is a diagram of the system showing the call being offered to multiple potential call-buyers and then being awarded to a single call-buyer who receives the unmasked caller information, according to non-limiting embodiments.

FIG. 7 is a further, non-limiting embodiment. In FIG. 7, a call award process 14 and the Awarded Call Buyer 10 receiving the caller's phone number 1 and any associated call metadata and lead form data 9 are shown. In this embodiment, the unmask event can occur at the moment of award or at a later time. As illustrated, the masked caller ID 7 is sent to all three Potential Call Buyers 11, 12, 13 and a Call Award Process 14 is initiated. The Call Award Process 14 may include any number of software routines for determining which Potential Call Buyer 11, 12, 13 is the Awarded Call Buyer 10. Various methods are described herein for implementing the Call Award Process 14. Once the Awarded Call Buyer 10 is determined, the unmasked phone number 1 and data 9 are shown.

Figure 8:
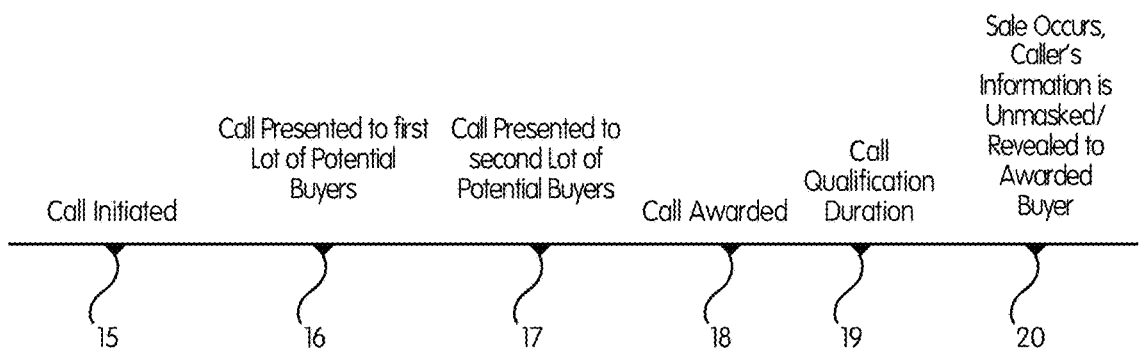
FIG. 8 is a diagram of the system showing the call being offered to more than one (1) lot of potential call-buyers at different points in time and a post-award call qualification duration that elapses before the caller's information is unmasked to the awarded call-buyer, according to non-limiting embodiments.

FIG. 8 illustrates a timeline according to a non-limiting embodiment where a set of potential events are shown in sequence. A call is initiated 15, presented to a first lot of potential call-buyers 16, and then after some duration, presented to a second lot of potential call-buyers 17, and then the call is awarded to a call-buyer 18, and then another specific duration threshold is achieved where the connected two-party call becomes sufficiently long to be a qualified call 19, and then the unmask data reveal event occurs 20 to reveal the unmasked phone number and other data to the buyer's systems.

Figure 9:
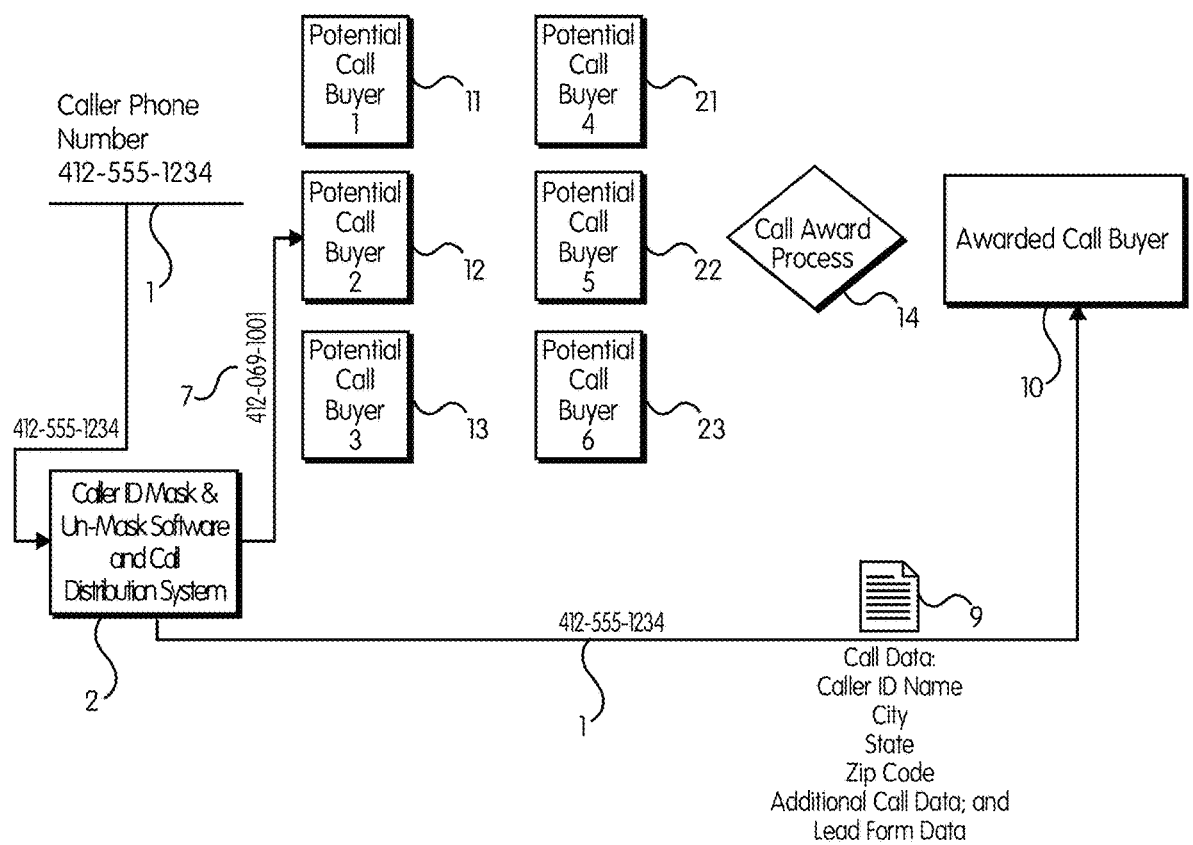
FIG. 9 is a diagram of the system that overlays the timeline from FIG. 8 on top of a flow diagram, according to non-limiting embodiments.

FIG. 9 illustrates the timeline from FIG. 8, as discussed above, in addition to a flow diagram according to a preferred and non-limiting embodiment. In the illustrated example, there are multiple lots of call-buyers. A call qualification duration threshold value is used, such that the data reveal of the unmasked phone number and other data is withheld until the call achieves said duration threshold and becomes a billable call to the call-buyer. The duration threshold may be a predetermined value, input by a user, and/or dynamically changed based on other parameters. In other embodiments, the call duration threshold will be zero and hence the award/connection of the caller with the buyer is the qualified call/billable event and the unmasking event (e.g., data reveal) may occur at the moment of the connection and award.

In a call-buyer/call-seller marketplace, the call-seller may have advertised a telephone number the customer is responding to or may be attempting to transfer the caller from a call transfer agent. In either case, the call-seller depends on controlling the lead's contact information until such time as a sale can be made. When transmitting caller ID in a call-seller/call-buyer circumstance, the act of transmitting a potential customer's (lead's) telephone number may in fact grant a potential call-buyer at least two possible pieces of information: (i) information that the caller is potentially interested in the call-buyer's services; and (ii) means of identifying and contacting the customer. Therefore, obscuring the caller's phone number from a potential buyer's telephone system, e.g., a caller ID log, CRM call tracking log, etc., until such time as a positive person-to-person voice connection can be made adds value to the call-seller. In one non-limiting embodiment, the call-seller can mask the caller ID information until such time as either a positive connection or an otherwise billable event occurs (e.g., connections lasting "X" seconds or "Y" unsuccessful call attempts have been made), at which time the caller's telephone and other information collected can be made available to the call-buyer.

In another non-limiting embodiment, using a selectively masked caller ID allows for correct routing, control of the value of the caller, and facilitates the near-simultaneous offer of the call to competing call-buyers and to competing sales agents within a call-buyer enterprise.

In non-limiting embodiments, caller ID entry may be used to match a live transfer call, which cannot pass the caller ID telephone number directly, with a data match option. For example, when a warm call transfer agent does not have the ability to transmit correct caller ID telephone number information, or when the caller is using a system that restricts the transmission of their actual telephone number, e.g., Magic Jack or caller ID blocking system users, this embodiment queries the caller to either enter the real phone number or the state and/or zip code for the area that they are calling about, and then uses that information to route the call properly. In this example, the entered information may or may not be used to match to existing customer lead data prior to routing the call.

For call centers and transfer agents who call a lead/customer or receive a call from a lead/customer and then transfer the lead to a receiving call center or agent, the intermediate call center or transfer agent may be unable to pass the phone number to the receiving call center/receiving agent. To solve this problem, the system may provide settings for the transfer numbers. In a first setting, the system may require the agent to enter and verify the lead's/customer's phone number into an IVR system prior to routing the call to the receiving call center/receiving agent. The entered and verified telephone number may then be presented to the call center/receiving agent directly or after a billable qualification duration threshold has been reached.

Additionally, in a second setting, the system may check to ensure the lead's/customer's contract information is present in the system, upon receipt of such information and prior to allowing the call transfer to progress. This ensures that any lead data required for use in the call distribution process or required thereafter by the receiving call center/receiving agent is present, matched, and attached to the call prior to connecting the call to the receiving call center/receiving agent. With this setting enabled, the call distribution cannot progress without the presence of the matching lead data. It will be appreciated that various other settings may be provided with respect to such call transfers.

In non-limiting embodiments, call information may be combined or joined with one or more separately assembled data records. The data may be posted before or after the call into the system, which then facilitates the call routing. Further call-buyer purchase orders with daily qualified call caps (e.g., maximum number of calls the buyer is willing to accept and purchase for a given day of the week), price per qualified call, and customer data filters may be used. A customer data filter may include parameters with a specified value or range such as, for example, Refinance loans with Loan Amount>=X, Loan-To-Value<=Y, and Property addresses located in TX and MA. Those skilled in the art will appreciate that various parameters and combinations of parameters may be used to filter customer data. Such filters may be predetermined or entered/selected by a user through a graphical user interface.

In non-limiting embodiments, the true caller ID name, caller ID telephone number, and lead data may be revealed to an awarded call-buyer upon successful connection or upon a qualified billable event in real time, e.g., after a predetermined time period, wherein the methods of the reveal can be one or more of the following: the system can speak or display information to the awarded agent prior to connecting the call, a post into the call-buyer's customer relation management (CRM) platform, a post with agent assignment into the call-buyer's CRM, update of awarded agent's hardware phone display using SIP (or update of their web phone or soft phone using similar data exchange to change the caller ID information), an email with all relevant information, and/or SMS text(s) with relevant information.

In non-limiting embodiments, the awarded call-buyer or agent may be identified via entry of a unique ID or pin into an IVR system with verification, so that the lead post/reveal can be sent in via email and/or into the call-buyer/advertiser's CRM pre-assigned to a specific agent. In other words, the lead may be submitted into the CRM pre-assigned with an identifier (e.g., agent=user@callerready.com) as part of the lead creation post. This protects the lead within the call-buyer's CRM from being routed and assigned to another agent.

In non-limiting embodiments, call distribution may be prioritized based on speed and/or an auction among call-buyers. For example, the system may require pressing "1," or some other key or sequence, to accept a call among call-buyers who are open and requesting matching calls. One of the benefits of a multiple call-buyer distribution approach is that it addresses issues concerning the speed of connection, thereby improving the connection success rate for the call-supplier and improving the emotional quality of the conversations that occur. This leads to better calls and more sales for the call-buyers. The consumer (caller) also benefits because they receive assistance in a timely manner. Further, these competitions can be run as auctions to yield the maximum net revenue for the call-supplier, wherein the call-buyer with the highest price-per-qualified call or effective price-per-qualified call is ranked first in the call order. The buyer with the second highest effective price-per-call is ranked second, and so on.

In non-limiting embodiments involving a real-time auction among call-buyers, the effective price-per-call may be calculated based on the price a buyer is willing to pay, and discounted by various factors such as, but not limited to, call-buyer specific return rate, rejection rate, percentage of qualified calls to connected calls (e.g., in situations where the connected call duration must last a specified duration or number of seconds to become a billable qualified call), acceptance rate of the calls offered, lead qualification filters (e.g., wherein the buyer is only purchasing calls when the lead meets certain criteria), the size of the call-buyer's overall order, and/or the strategic value of the call-buyer to the aggregator or call-supplier.

In non-limiting embodiments, various methods may be used to rank competing call buyers for an incoming call. For example, a quality score may be generated by at least one software application using various factors, variables, and/or other considerations. Such factors may include, for example, an effective cost-per-call, return rate, strategic priority, geography, lead data filters and values, return rate, ease of doing business, percentage of daily limit filled, order fill rate, concurrency limit utilization, historical offer-to-win rate, historical qualified billable call-to-awarded call rate, and/or the like. By normalizing such data and applying a normalized weighting to each of these factors, the system generates an overall ranking for each potential matching buyer. Similarly, a multivariate weighting process such as the Analytic Hierarchy Process may be used to derive weights for these component variables of the call-buyer quality score.

A generated call-buyer quality score may be dynamically adjusted based on ratings, performance metrics, strategic priority, call pacing goals, and daily fill rate, as examples. Call Purchase Orders (e.g., agreements to purchase calls subject to certain constraints) may be analyzed for various factors, including office hours (the specific hours during which the buyer is willing to receive calls), limits (daily or hourly qualified call limit, and/or total qualified call limits on an order), concurrency (e.g., how many utilized lines/calls can the system make into a buyer's number at the same time; for example, 10 simultaneous calls maximum, only one call at any given time, unlimited, and/or the like), payout (e.g., what the call-buyer agrees to pay for a qualified call), effectiveness rate (e.g., the qualified call to award rate), return rate (e.g., percentage of calls matching the qualified call duration that the buyer requests to return/refund), and/or the like. There may be an automatic shut-off for a call-buyer (i.e., calls will no longer be offered) if the call-buyer misses all calls during a given time period, or if the call-buyer meets some other specified parameter. Orders may be tracked, and payments may be collected from call-buyers against any prepaid amounts. The system may generate invoices automatically based on the collected data.

An automatic shut-off for a call-buyer means the call-buyer failed to compete or accept calls during an agreed-upon period that they had stated on a submitted order. In other words, a call-buyer's purchase order agrees that the call-buyer will be open and accepting calls during a certain period and, starting at a time within that period, a predetermined number of calls are presented in a row where the call-buyer does not answer within an allowable/expected timeframe, e.g., their line is busy, the calls go into a queue, and the buyer does not press "1" before a predetermined period of time, the calls are connected but all fail to reach a minimum qualification duration, etc. These signals specify that the call-buyer is not actually receiving calls properly when they said they would. Automatic shut-off pauses delivery in these situations and the incidence of automatic shut-off may be a negative factor in the quality score of a call-buyer.

In non-limiting embodiments, a number of distribution ranking modes may be selected by a user to control how calls are distributed to the call-buyers. For example, such distribution ranking modes include, but are not limited to, (1) a Straight Strategic Priority-Weight Rank mode, where a higher priority is a higher rank, (2) a Targeted Distribution Mix mode, (3) an Optimal Buyer Weighting mode, and (4) an Optimal Buyer Weighting mode with Targeted Mix and Variable Weighting. Various other modes, and combinations of modes, are possible.

As described above, various factors may be weighted to rank each of the call-buyers. First, the system may determine the potential call-buyers to rank based on whether their schedules are open, lines are available within their concurrency limits, not yet reached their daily call limits, not yet reached their purchase order limits, call matches their routing rules, and/or the like.

In a non-limiting embodiment, a trailing time period is determined during which the system tries to deliver calls based on the targeted distribution mix (e.g., last hour, 2 hours, 3 hours, 4 hours, 6 hours, 10 hours, 12 hours, 18 hours, 24 hours, 48 hours, 3 days, and/or the like). In order to calculate the relative proportion of calls delivered to any given call-buyer during a given time period, the system evaluates the proportion of calls delivered within the trailing time period. A goal of this embodiment is to satisfy as many call-buyers as possible by delivering the rate or call flow they are desiring without oversaturating or starving any given call-buyer for a time period when they have sales people awaiting calls.

Various methods, tools, and settings may be used to prevent unattended call delivery problems in non-limiting embodiments. For "No Verify" problem cases (e.g., where the system will award/connect the caller to a call-buyer or agent's phone number as soon as the call-buyer or agent's phone system answers, without having to press any keys), the system may provide an optional short call warning to turn a call-buyer off automatically when the most recent set of a predetermined number (e.g., "X") of calls received by that call-buyer lasted less than a predetermined number (e.g., "Y") of seconds, and send an email or other communication to prevent a closed call-buyer from ruining lead delivery effectiveness for the call-supplier. For "With Verify" cases (e.g., where a call-buyer or agent must use a telephone keypress verification or some other form of verification), an automatic pause call-buyer option may be provided for any call-buyer who has received a predetermined number (e.g., "X") of calls offered in a first highest ranked call-buyer position wherein the call-buyer is called prior to calling any other potential call-buyers and yet this call-buyer is not without winning any calls. In such cases, the system may automatically notify a call-supplier that the call-buyer is experiencing a problem and may need a different call routing configuration to actually win call competitions, e.g., initiate calls to this buyer with longer headstart and a headstart lot size of one (1) to get any calls, or that the call-buyer's system or office may be shut down.

The Straight Strategic Priority Ranking mode ranks call-buyers based on weights only, irrespective how frequently a given call-buyer is winning call competitions, e.g., no consideration is being made to attempt to award competing buyers a targeted share of the calls in a given time frame.

The Targeted Distribution Mix mode of ranking and fulfilling orders ensures all competing call-buyers are presented the opportunity to receive a minimum share of calls in a given timeframe. In this mode, each call-buyer group is assigned a targeted percentage of the call delivery, e.g., 10% of calls for call-buyer one, 20% of calls for call-buyer two, etc. The targeted distribution mix mode ranks matching call-buyers based on a difference between the targeted percentage of calls delivered minus the actual percentage of calls delivered to the given buyer during a trailing time period, and essentially ignores the other potential weighting factors. The buyer with largest difference is ranked first in the calling order. Typically, the targeted distribution mix refers to "qualified/billable calls" delivered within the timeframe, but it can also be based on the number of "calls awarded" or the "calls offered". The "targeted distribution mix" variable may be normalized among available matching call-buyers. This can be done by summing the total number of available matching call-buyer's targeted mix percentage, and then dividing each of the available matching call-buyer's targeted distribution mix by this sum to get the normalized target distribution mix for each call-buyer and finally calculating the gap between the normalized target distribution mix and the actual distribution mix and ranking from the highest difference to the lowest difference. Each time a call is received, the system can therefore find matching call-buyers, total them, normalize the weights, and rank the buyers accordingly. For example, three (3) matching available call-buyers each having a 10% targeted distribution mix can be normalized such that each receives 33% of calls.

With the Targeted Distribution Mix mode enabled, the system attempts to transfer a specific percentage of calls within a time period to each call-buyer based on the targeted distribution mix value for that call-buyer. The system will attempt to maximize the spacing between calls for each call-buyer to provide a steady delivery or pacing to each call-buyer instead of fulfilling each call-buyer sequentially. In other words, this method tries to smooth call delivery over time and avoid oversaturating any given call-buyer at any given time.

The Targeted Distribution Mix may then be calculated based on the largest calculated Call Gap value. The Call Gap may be calculated with the following equation: [Normalized Targeted Distribution Mix—Actual Distribution Mix] where the Actual Distribution Mix is (Connected Calls within Time Period/Total Matching Calls within Time Period). When there are equal calculated Call Gap values, ties may be broken using the Optimized Buyer Weight and then, if still equal, Strategic Buyer Priority, and if still equal, the equal buyers may be randomized to force a rank among them.

Figure 10:
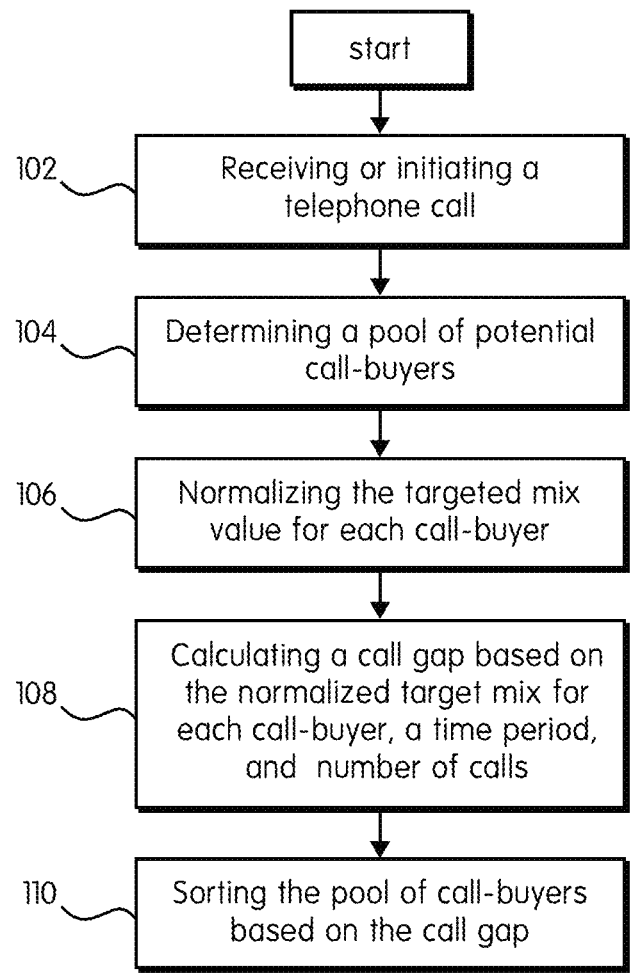
FIG. 10 is a flow diagram of a method for ranking call-buyers according to non-limiting embodiments.

Referring now to FIG. 10, a flow diagram for a ranking process is shown according to a non-limiting embodiment. Here, the method starts at step 102 when a telephone call is received (e.g., an inbound call) or initiated (e.g., a system or operator-generated call). Next, at step 104, a pool of potential call-buyers for the telephone call is determined. As described herein, a number of factors may influence the determination of the pool of potential call-buyers. Next, at step 106, the targeted distribution mix values for the pool of potential call-buyers are normalized according to the methods described herein. Then, at step 108, a Call Gap for each call-buyer is calculated based on the normalized targeted distribution mix value, a time period, and a number of calls made in that time period by that call-buyer. As described herein, there are multiple other ways to calculate the Call Gap. Next, at step 110, the pool of call-buyers are sorted based at least in part on the Call Gap for each call-buyer, using a suitable sorting algorithm.

A Round Robin mode of ranking (i.e., an even cadence model) is the Targeted Distribution Mix mode described above when all available call-buyers have equal targeted distribution mix values. If this occurs, there will be even cadence among the ranking of call-buyers for each call. This mode effectively ranks call-buyers by the last time they were awarded a call because the normalized targeted distribution mix quantity is the same for each call-buyer.

An Optimal Buyer Weighting ranking mode fulfills orders in order to optimize profits. The Optimized Buyer Weight may be calculated with the following equation: (Effective Price-Per-Call*normalized Gap to (Daily or Total) Order Limit Percentage*normalized Strategic Buyer Priority); where Effective Price-Per-Call is equal to [Price*(1-Return Rate)*(1-Qualification Rate)]. Various other equations may be used. The call order of the call-buyers may then be ranked based on this calculated Optimized Buyer Weight factor.

In the Optimal Buyer Weighting mode, the Gap to the Targeted Distribution Mix may be substituted for the Gap to Order Limit Percentage. Further, the Optimal Buyer Weighting mode may incorporate weighting of the equation components. For example, a user may provide various weights to different factors to build their own algorithm for optimizing the distribution of calls. Call-sellers can therefore adjust the weights of different variables in response to call distribution feedback they receive from call-buyers. It will be appreciated that users may provide weights in various different ways, including entering input or manipulating selectable options on one or more graphical user interfaces.

An algorithm in a preferred and non-limiting embodiment of the Optimal Buyer Weighting mode of ranking may execute the following equation to calculate an Optimized Buyer Weight: (Effective Price-Per-Call*normalized Gap to (Daily or Total) Order Limit Percentage*normalized Strategic Buyer Priority*normalized Targeted Distribution Mix); where Effective Price-Per-Call is equal to [Price*(1-Return Rate)*(1-Qualification Rate)]. Weights can be provided to each of these variables so that the targeted distribution mix could potentially carry more weight than the Gap to Order Limit percentage. The Strategic Buyer Priority Weight may be set to zero (0) unless it is needed. The call-buyer order may then be ranked based on the calculated Optimized Buyer Weights.

Potential call-buyers may be dynamically weighted for each phone call. In non-limiting embodiments, the weights of the variables or call-buyers can be directly changed and/or input by a user. In non-limiting embodiments, an even Round Robin distribution method may be used based on how long it has been since the call-buyer was previously offered a call. In other embodiments, the call-buyer ranking originates from a third-party system and can be passed into the call distribution system. Once a ranking is either determined or received, an optimization between awarding the call to the highest ranked, the soonest-available call-buyer/agent can be staged in real-time by implementing the initiation of calls to each ranked call-buyer/agent with successive call lots and using intentional delays between initiating calls to competing call-buyers in said call lots. The delays allow the system to provide higher-ranked call-buyers with a better chance at winning the call competition by providing one or more call-buyers with a headstart.

In this manner, a call can be awarded to the first call-buyer/agent to answer or, in a non-limiting embodiment, the first call-buyer/agent to "Press a key", e.g., "Press 1" or some other keypress/sequence, on their telephone keypad. The key-press affirmatively indicates that the call-buyer/agent is ready and able to accept the call, and prevents connecting a caller into a voicemail system or a hold queue. Once a call-buyer/agent is awarded the call, the other lines are immediately hung-up on. In another embodiment, in the case of a second overlapping call that comes in prior to the other lines being hung-up on, the remaining competitor buyers/agents can immediately be placed into competition for the second call.

In another non-limiting embodiment, and as described above, the call can be awarded to the highest ranked call-buyer/agent who presses a key within a predetermined number (e.g., "X") of seconds or time period (a "wait for better call-buyer/agent" time period) from the moment the first call-buyer/agent presses a key. If the highest ranked call-buyer/agent is also the first call-buyer/agent to press a key, the competition may be immediately ended and the caller will be connected with said highest ranked caller-buyer/agent. Once the "wait for better call-buyer/agent" period elapses, the call is awarded to the highest ranked buyer who pressed a key and the other lines are hung-up on. In another non-limiting embodiment, during the "wait for better call-buyer/agent" the available call-buyers can increase their bids or buy the call immediately by agreeing to a specified higher price than their baseline bid on their call order.

There are numerous ways to stage call competitions between multiple competing call-buyers and/or agents. For example, a headstart mode may be used where the top-ranked call-buyer is called first and, after a predetermined number (e.g., "X") of seconds, the rest of the matching call-buyers are called. The maximum number of ranked call-buyers called per caller can be set to control call distribution costs. As another example, a headstart mode may dynamically size the headstart lot and maximum included call-buyers/agents to call in order to optimize the speed of connection against the call distribution costs. For example, with ten (10) ranked buyers in the competition, the headstart lot size might be set to two (2) buyers who are called first and then, after five (5) seconds, an additional lot of five (5) are called, and then after another five (5) seconds, the final lot of five (5) buyers are called. The call competition can end as soon as any of the buyers presses a key to win the call.

The dynamic aspect of the headstart lot size and associated lot delays is based on optimizing the process so that the fewest number of call-buyers are called to connect a call at the highest effective price within a predetermined number (e.g., "X") of seconds. For example, if the goal is to sell the call at the highest price within four (4) rings or about 15 seconds, the system can adjust the Effective Price Per Call [Buyer's price per qualified call*(1–the buyer's qualified call return rate)*(qualified calls for this buyer/connected calls for this buyer)] by multiplying it by the frequency the buyer presses 1 within 15 seconds of call initiation. So, if a buyer always presses 1 within 15 seconds of call initiation, the Time Adjusted Effective Price Per Call=100%*Effective Price Per Call. And if a buyer historically only presses 1 within 15 seconds of being called 50% of the time, the Time Adjusted Effective Price Per Call=50%*Effective Price Per Call. Then using the probabilistic Time Adjusted Effective Price Call to determine the call order for the competition will yield highest Effective Price Per Call on average within 15 seconds, provided the call competitions are allowed to run for 15 seconds.

Through these time-to-connect metric adjustments to the Effective Price Per Lead, the call-buyer rankings are further modified. Then, by varying the headstart lot size to be larger or smaller, the system can optimize toward the highest connection rate possible within a predetermined number (e.g., "X") of seconds, at the highest effective price, and with the fewest number of competing buyers in the competition (e.g., at the lowest call distribution cost).

In other non-limiting embodiments, the lot sizes can be constant and staggered with a uniform delay between successive lots. In a non-limiting embodiment, an overflow call-buyer of last resort may be used to ensure connections are always made. This buyer of last resort is characterized as a buyer who will buy a large number of calls but at a lower price point. In other non-limiting embodiments, if a call fails to route within a specified competition within the allotted competition time, the system can loop and retry the matching buyer pool a second time, or it can use IVR to offer the caller an opportunity to be called back when a representative becomes available (e.g., intelligent abandonment).

In non-limiting embodiments, a ranked pool of potential call-buyers or agents is dynamically passed in or otherwise supplied from a ranking system in real-time. For example, the ranked pool may be provided in substantially real-time when a call is first received. In this example, the call distribution system may query the ranking system for the list of ranked potential call-buyers or agents, and the call distribution system uses the returned list to implement the competition among the call-buyers or agents for distributing the call. Further, the call distribution system may gather additional information via an IVR system and provide that information to the ranking system for use in developing the matching ranked set of call-buyers/agents. It will be appreciated that this ranking system may be hosted by a third party, and may also be hosted by the call distribution system.

In non-limiting embodiments, the call distribution system may match the caller to existing lead information based on the caller's phone number and then provide this information to the ranking system for use in developing the list of ranked call-buyers. In other non-limiting embodiments, the call distribution system may be configured upon receiving a form fill data lead to first seek and award this data lead to a call-buyer/agent, prior to connecting the awarded call-buyer/agent on an outbound call to the lead (i.e., initiate the call to the call-buyers/agents first), or it can occur when a lead is called by the system first, prior to initiating the call to the call-buyers/agents.

In either case, the information about the call connection can be made available to the lead in a web browser, including information and links related specifically to the awarded call-buyer/agent. This may include, for example, updating an on-screen call status monitor with the awarded buyer/agent information, links, and/or pictures, and providing the lead with the awarded buyer/agent's caller ID telephone number information on screen so the lead can recognize who is calling them. This method of providing more information about who is calling promotes the answer rate and connection rate between leads and call buyers/agents. Once a call is connected, the awarded party, call duration, link to a recording, and other call metadata can be transmitted back to the ranking system or some other third-party system for tracking, billing and additional analysis.

In non-limiting embodiments, once a ranking is dynamically developed, an auction and/or competition can be further staged by the use of lots. Lots, as used herein, refer to the group of call-buyers who are called simultaneously or in rapid succession. Lot sizes can range from one to many. The lot sizes can vary with each lot and can vary dynamically based on the number of available potential buyers and other factors.

In non-limiting embodiments, a call-buyer may indicate that they are available to receive calls by setting their office hours, having an open order, and/or having their status set to "Active." However, the call-buyers still answer the phone and press a key, e.g., press 1, to accept the call.

As already described, in a competition and/or auction, the winner can either be the first buyer to press "1" or some other key, sequence, or input, or it can be structured so that the winner is the highest ranked buyer to press "1" or some other key or input within a predetermined delay (the "Wait for Better Buyer Delay"). For example, if the highest ranked buyer presses "1" first, the competition is immediately ended and the winner is immediately awarded the call. If a non-highest ranked buyer presses "1" first, they can still lose the competition if a higher ranked buyer presses "1" within the "Wait for Better Buyer Delay" duration, e.g., a specified duration or number of seconds from the time the first buyer to press "1." In non-limiting embodiments, the present invention allows for buyers to be able to increase their bids during the "Wait for Better Buyer Delay" period. For example, if a call-buyer presses "1" and has a lower bid than the current highest bidding call-buyer, the system may offer that call-buyer the opportunity to increase their bid by a specified amount to jump to the highest position. The system can also affect several rounds of bidding to seek the maximum revenue for the call. These additional real-time adjustments to win the call outright are communicated by the call-buyer to the system via telephone keypad key presses, via voice recognition, and/or via on-screen software controls.

In a non-limiting embodiment, in the "Wait for Better Buyer Delay" scenario described above, the system may allow a call-buyer to increase their bid price to buy the call outright and end the auction immediately for either (i) their maximum predetermined bid; (ii) an offered price in real time, e.g., "win this call now for $Z"; or (iii) for an additional dollar amount, e.g., "win this call now for an additional $Y." These additional real-time adjustments to win the call outright are communicated to the system via telephone keypad key presses, via voice recognition, and/or via on-screen software controls.

In non-limiting embodiments, lot structures may be optimized. For example, the system may use multiple goals to optimize the lot sizes, delays, and/or sequencing. These goals can include, but are not limited to:

1. Connection Qualification Rate, i.e., qualified calls divided awarded calls;
2. Net Revenue, e.g., selling the call for the highest price net of expected returns/rejection rates;
3. Caller Hold Time, e.g., minimizing the caller hold time or keeping it below a threshold, e.g., X seconds maximum hold time;
4. Geography, e.g., the approximated distance between the caller and the service/product supplier;

5. Quality, e.g., the qualitative ranking of call-buyer based on user reviews or other third-party available ratings systems;

6. Priority, e.g., the strategic value of the buyer to the call aggregator or call supplier;

7. Purchase Order Size, e.g., the relative size of the open orders;

8. Purchase Order Fill Rate, e.g., the fill rate against the daily, weekly, and monthly goals for the call-buyers; and 9. Call distribution costs, e.g., minimizing the expense of the call-buyer seek process incurred by the calls made to the non-winning call-buyers.

In a preferred and non-limiting embodiment, time-based qualified billing may also be used. Further, call routing may be prioritized based on an effective cost-per-call. As already described, a real-time auction may be used to award the call to the highest bidder among available call-buyers/agents. In such an auction process, a time-based buffer (e.g., a specified duration) may be used to wait for a higher ranked call-buyer or sales agent prior to awarding the call. The bid rankings may be modified by return rate, close rate, or tenure of the agent.

In non-limiting embodiments, provided are methods and systems to repeat call distributions. Settings may be provided to protect leads sold to a given call-buyer or agent, and subsequent calls from the same lead may be re-routed to a previously assigned call-buyer/agent. In an alternate non-limiting embodiment, repeat calls from the same lead are routed to different call-buyers/agents and specifically excluding a previously-billed call-buyer or a previously connected but not billed call-buyer. Further, in non-limiting embodiments, customers may be provided with the ability to reconnect to a previously connected call-buyer, or to rate shop and contact a new service provider, at the caller's direction. In some non-limiting embodiments, calls may be queued for multi-buyer and single company distribution. IVR systems may be used to collect and qualify data. IVR may also be used to handle overflow calls and provide the caller with the ability to intelligently abandon the call. In non-limiting embodiments, a voice message may be received and then delivered to the awarded call-buyer and/or sales agent prior to initiating the outbound courtesy call back to the caller.

In non-limiting embodiments, overflow IVR is used as a transfer agent and presents callers with retry and/or intelligent abandonment options. For example, when a call distribution fails because no matching call-buyers are available in a timely manner, this embodiment can provide retry attempts to re-query the pool of potential service providers/call-buyers, or it can offer to hold the caller's place in queue until such time as a matching available service provider is located, prepared for the call, and the outbound follow-up call to the lead is facilitated.

In non-limiting embodiments, an automated after-hours call-handling method may be used to greet callers. For example, a greeting may be played and the caller may be presented with a number of options for specifying a call back time on the next available business date presented. Such options may include, but are not limited to, (1) as soon as possible; (2) morning; (3) afternoon; (4) evening; or (5) a user-selected specific time within the business' stated office hours. Upon confirming a selection, an SMS text message and/or email confirmation may be transmitted to the lead. Then, at a specified time when the office re-opens, a pre-call reminder warming SMS text message may be sent out a minute, or at some other predetermined time interval, before the first call attempt, e.g., a pre-call warming SMS to improve the answer rate.

In a non-limiting embodiment, the system initiates the connection with a call into the agent/representative/call-buyer first, presents information about the lead's request for the callback, and then connects the agent/representative/call-buyer on an outbound call to the lead. In an alternate non-limiting embodiment, the system makes an attempt to reach the lead on the telephone first, prior to connecting with a representative/agent/call-buyer. In this case, up to three (3) (or some other predetermined value) initial outbound call attempts with pre-recorded messages are made, separated by three (3) minutes (or some other predetermined time period) in the first ten (10) minutes (or some other predetermined time period) asking the lead to press "1" to speak with their representative.

In non-limiting embodiments, the system may be used to schedule calls. For example, a voice message may be received and delivered to an awarded call-buyer prior to speed-to-respond features. For example, once a voicemail is received by the system, the system may then continue seeking a call-buyer who wants to take the courtesy callback. The awarded call-buyer then has the ability to hear the voicemail prior to initiating the outbound call. Further, a direct date and time may be received via an IVR system for a follow-up call. In examples, a time-of-day category may be selected by the caller through an IVR system or otherwise. A return call may be automatically queued for as soon as possible within allowable calling hours. Further, the return call may be facilitated through a call-buyer competition, an auction, or through a sales-agent-first calling process to award the call prior to initiating the outbound call leg to the customer. In some examples, the customer may be called first to ensure that they are still available for the call prior to facilitating the scheduled call assignment through a call-buyer competition, an auction, or through a sales agent distribution mechanism. In non-limiting embodiments, Express Written Consent (EWC) may be obtained through opt-in IVR and optional voice recording, affirming a positive consent to receive an automated call-back using a pre-recorded voice message. This feature facilitates compliance with the Telephone Consumer Protection Act (TCPA).

In another preferred and non-limiting embodiment, the system may be used in connection with call marketing lead generation, including connecting the caller with the right sales person as fast as possible, and capturing inbound calls. Features of the presently-invented system include a variety of processes, such as concierge services through real-time "speed to press 1" competitions and auctions, standardization of live transfer campaigns, ensuring the caller is qualified and that the lead data is joined with the phone call data for clean transfers every time without the problems associated with unqualified callers and missing data, and optimization of the marketing spend for each agent with internal call distribution based on product, state licensure, agent performance, and daily agent calls caps.

Figure 11:
FIG. 11 shows an advertisement on a search page according to non-limiting embodiments.

Referring now to FIG. 11, an advertisement on a search page is shown according to a preferred and non-limiting embodiment. This allows a user to connect with the best available service provider from a pre-screened minimum rated list of potential service providers. For example, the system may identify a ranked list based on geography and specialty from among pre-screened providers. Pre-screened providers may be required to meet a minimum generally accepted rating on a commercially available rating system, like the Better Business Bureau and/or user reviews. The system queries a service provider availability checking service to determine who is available to speak with the caller right now and completes the phone connection between the member and the best available pre-screened service provider. In this manner, consumers can be directly connected with service providers matching their search parameters who are available to talk at that moment. The system reduces delays related to voice messages, emails, and answering services. Also, providers receive phone calls and client information from highly interested potential clients at their moment of need. These calls can be trackable, demonstrating a significant return on investment (ROI) on the providers' marketing spend for participation in the call-buyer network.

Figure 12:
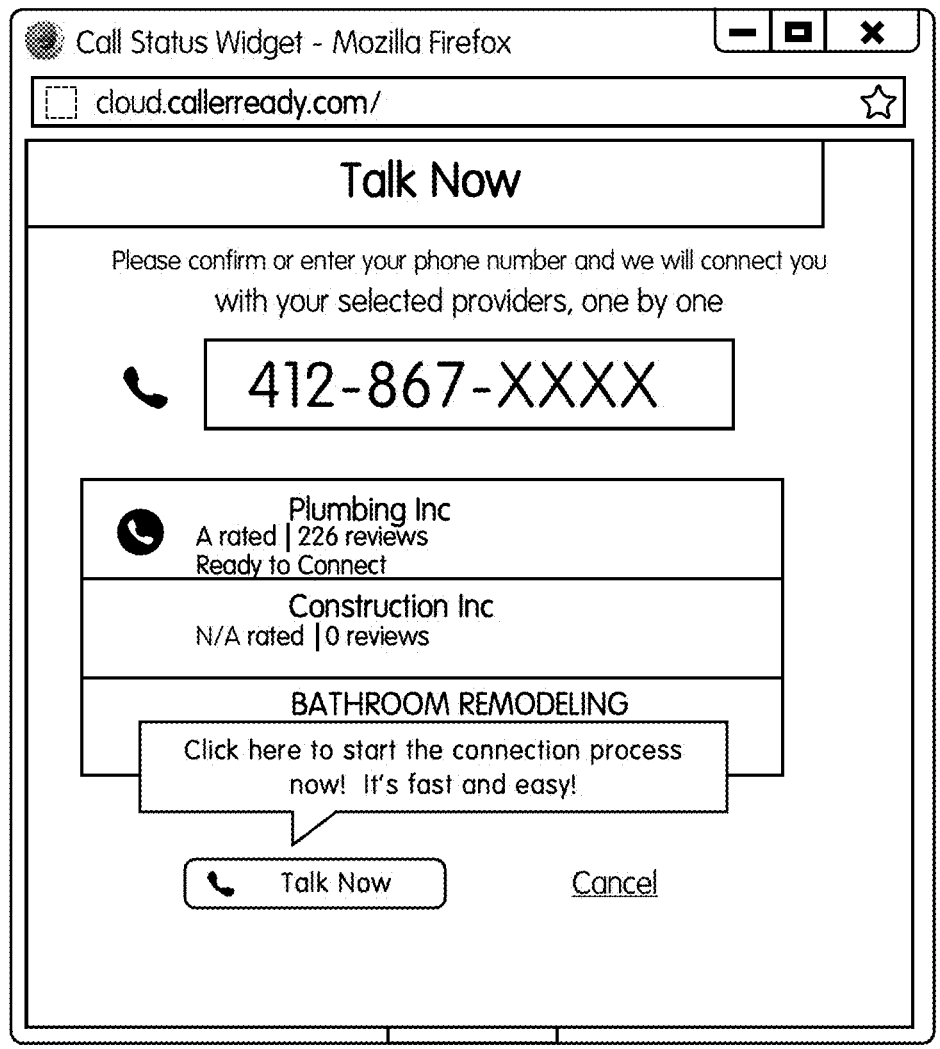
FIG. 12 shows a graphical user interface with user-selected service providers according to non-limiting embodiments.

Referring now to FIG. 12, a graphical user interface (GUI) is shown according to a preferred and non-limiting embodiment. This GUI shows service providers that have been selected by a user, such that the providers can call the user in an organized fashion that is managed through the GUI. This functionality may also be driven directly from an audio session with a user who controls the settings and manages the calls via an IVR system. As an example, the service providers shown in the GUI of FIG. 12 may be connected to the user in the order shown.

Figure 13:
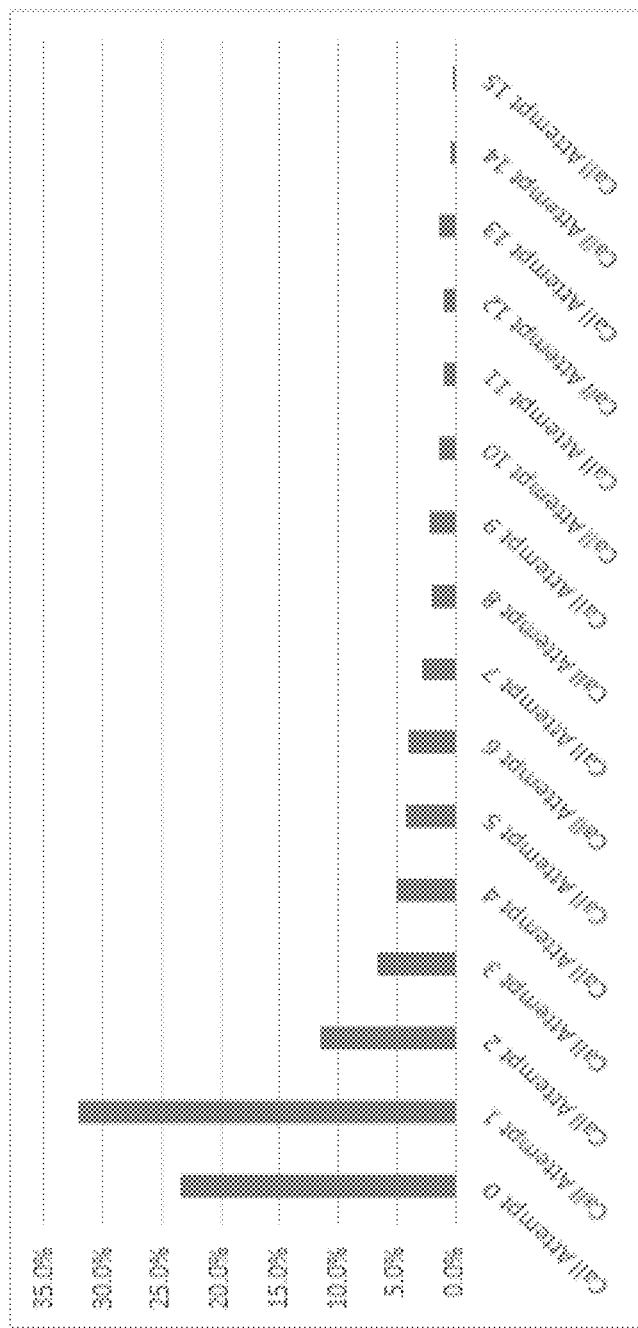
FIG. 13 shows test data for pay-per-call conversions over several contact attempts.
Figure 14:
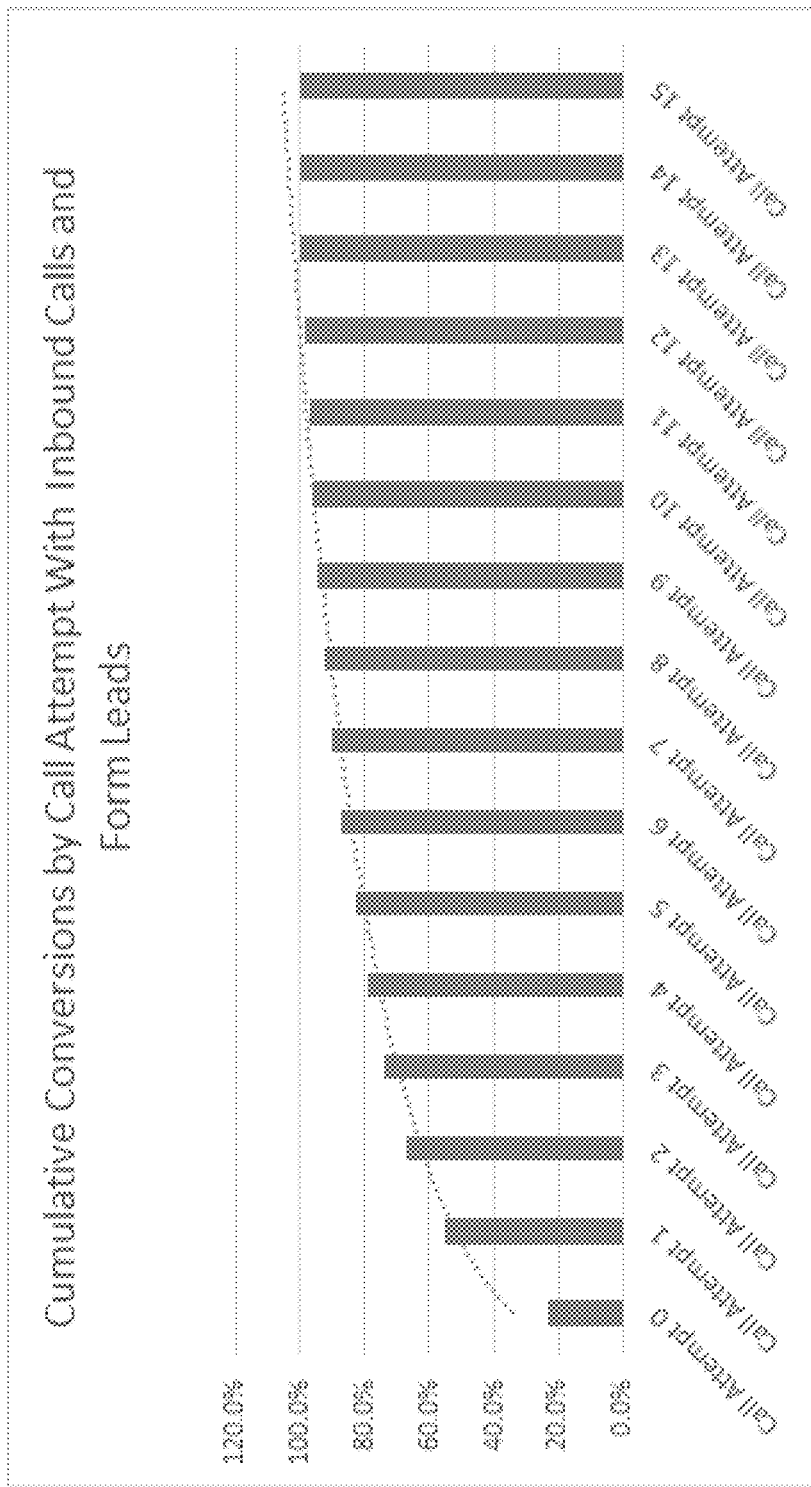
FIG. 14 shows test data for cumulative conversions with inbound calls and form leads over several contact attempts.

FIG. 13 shows test data for pay-per-call conversions over several contact attempts. FIG. 14 shows test data for cumulative conversions with inbound calls and form leads over several contact attempts. It will be appreciated that the data shown in FIGS. 13 and 14 are for exemplary purposes only.

FIGS. 15A and 15B show schedule tables for a system and method for automating a plurality of contact attempts for a lead according to a non-limiting embodiment. The number of contact attempts, contact type and script, and all other values shown in FIGS. 15A and 15B are for exemplary purposes only. One skilled in the art will appreciate that various other values may be used. The values may be inputted by a user, received from a remote server, and/or dynamically generated based on historical data and/or statistics. After transmitting a text message to a lead indicating that a call will follow (e.g., a pre-call warming message), FIG. 15A shows the first call attempt occurring one minute following the text message. However, it will be appreciated that, in some embodiments, a pre-call warming text message may not be utilized and the flow may begin with the first call attempt.

With continued reference to FIGS. 15A and 15B, subsequent contact attempts may be staggered by 3 minutes, 15 minutes, 2 hours, 3 hours, and/or the like. The schedule table also shows a maximum number of contacts per day (e.g., five for the first day and four for the second day), which may be set to any value. In some non-limiting embodiments, a maximum number of contacts may be a total number of contacts over the entire campaign period. After a predetermined contact attempt is reached (shown as the sixth contact attempt in FIG. 15A), another text message is automatically generated and communicated to the lead to convey a message (e.g., "sorry we missed you"), after which additional contact attempts may be made at predetermined intervals. The flow and frequency of the predetermined intervals may be referred to as a "cadence" and, in some non-limiting embodiments, the predetermined intervals may fluctuate based on the call attempt or remain static over some or all of the call attempts. Further, in some non-limiting embodiments, the contact attempts may be spaced apart by random intervals while, in other non-limiting embodiments, the intervals may be dynamically determined based on a predictive algorithm that determines an optimal time to make a call attempt based on past attempts and/or other lead data.

In some non-limiting examples, and with continued reference to FIGS. 15A and 15B, the call attempts may be automated and prompt the lead, if the call is answered, to provide a predefined input to connect to a call agent (e.g., press 1 to connect). In other examples, a lead may return a missed call attempt and be connected to a call agent based on an existing lead record or any other criteria. Calls may be distributed among multiple competing call-buyers, although it will be appreciated that embodiments of the system may be used with any call distribution and/or routing system.

The plurality of automated contact attempts may be stopped (e.g., the contact flow may be ended) in response to one or more end-states, determinations, or criteria. In a non-limiting embodiment, for example, the automated process may be halted in response to a call duration reaching and/or exceeding a predetermined minimum call duration, such as but not limited to a billable qualification threshold. The automated contact attempts may also be stopped if the lead opts out or otherwise requests to not be contacted anymore (e.g., requested to be added to a do-not-call list or the like).

In a non-limiting embodiment, the automated contact attempts may be constrained to a predetermined period of time (e.g., 30 or 60 minutes) to sell the call exclusively to a call-buyer. If the call is not sold within the predetermined period of time, then lead data may be posted or communicated to an external system for either exclusive or multi-sell (e.g., shared lead). In the case of multi-sell, the system may continue with additional contact attempts.

Referring now to FIGS. 16-28, exemplary GUIs are shown for non-limiting embodiments of a system and method for automating a plurality of contact attempts for a lead. FIG. 16 illustrates a dashboard GUI 1600 including the results of a lead-to-call automation campaign initiated with the system and method described herein. The metrics displayed include: (1) Customers gained through the campaign, (2) Customer Acquisition Cost, (3) Revenue earned from the customers gained through the program/campaign, and (4) Marketing Return on Investment (Marketing ROI), although various other metrics may be used. The Marketing ROI is calculated with the following formula: ((Revenue—Marketing Costs)/Revenue), where the Marketing Costs are the expenses associated with the campaign (e.g., generating the leads, converting the leads into phone calls with call agents, and/or the associated technology and telephony expenses). The dashboard GUI 1600 shown in FIG. 16 also includes a Connection Rate by Contact Attempt chart, including details concerning the number of connections that come from each contact attempt. Also shown in the dashboard GUI 1600 are the usage quantities by contact type (e.g., leads, calls, emails, SMS counts, etc.) associated with average talk times and total expenses. The dashboard GUI 1600 also includes a Productivity Metrics portion that depicts conversion rates associated with monitoring the effectiveness of the lead-to-call automation campaign.

Figure 17:
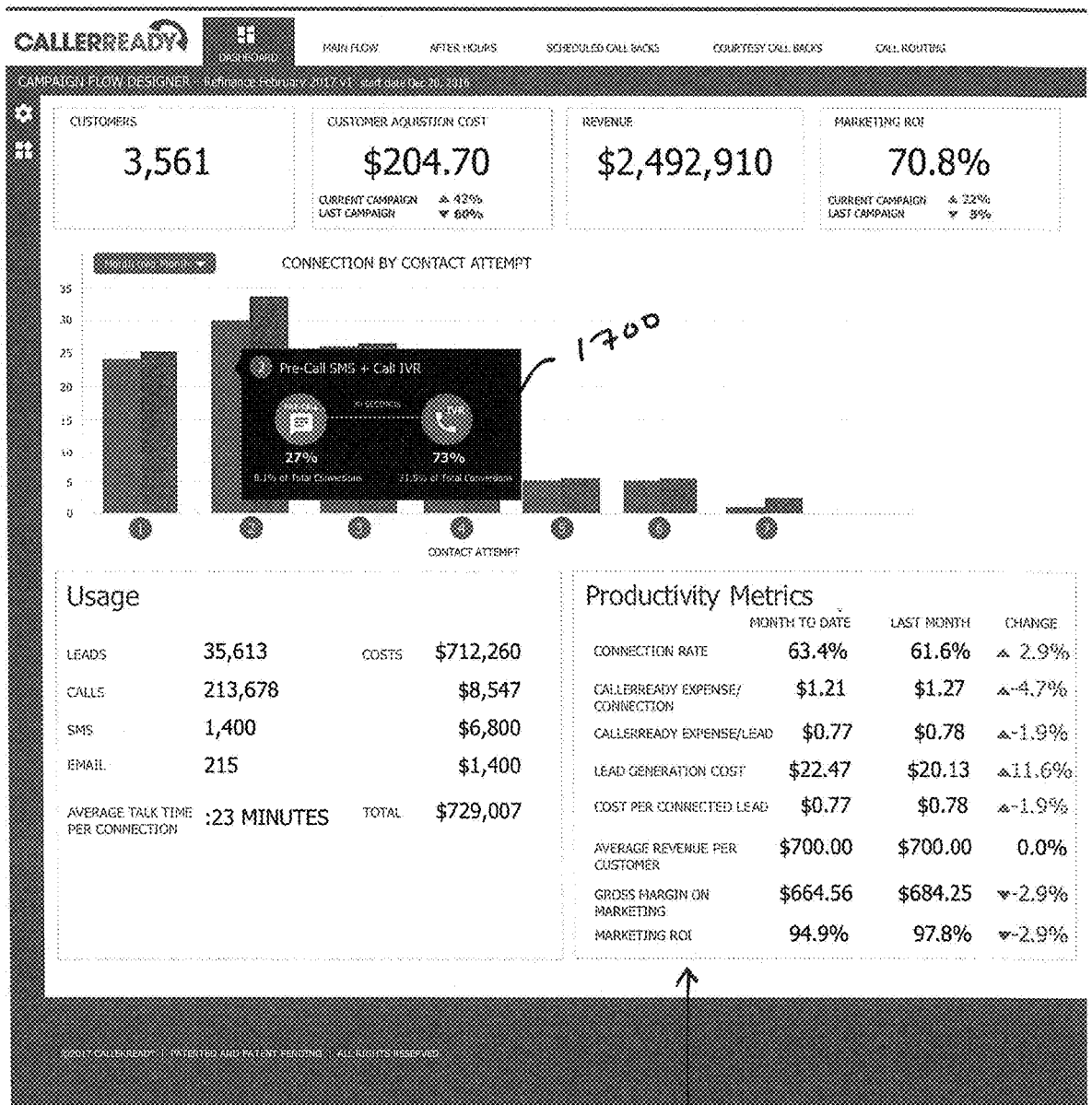
FIG. 17 shows another view of the dashboard GUI 1600 shown in FIG. 16 according to non-limiting embodiments.

Referring now to FIG. 17, another view of the dashboard GUI 1600 is shown according to a non-limiting embodiment. The dashboard GUI 1600 shown in FIG. 17 includes a pop-up window 1700 displaying the details of a selected contact attempt, including the sub-components of the contact attempts (e.g., SMS, IVR, and/or email), along with the associated contribution of each sub-component to the total conversion rate of the contact attempt and to the overall lead-to-call automation campaign.

Figure 18:
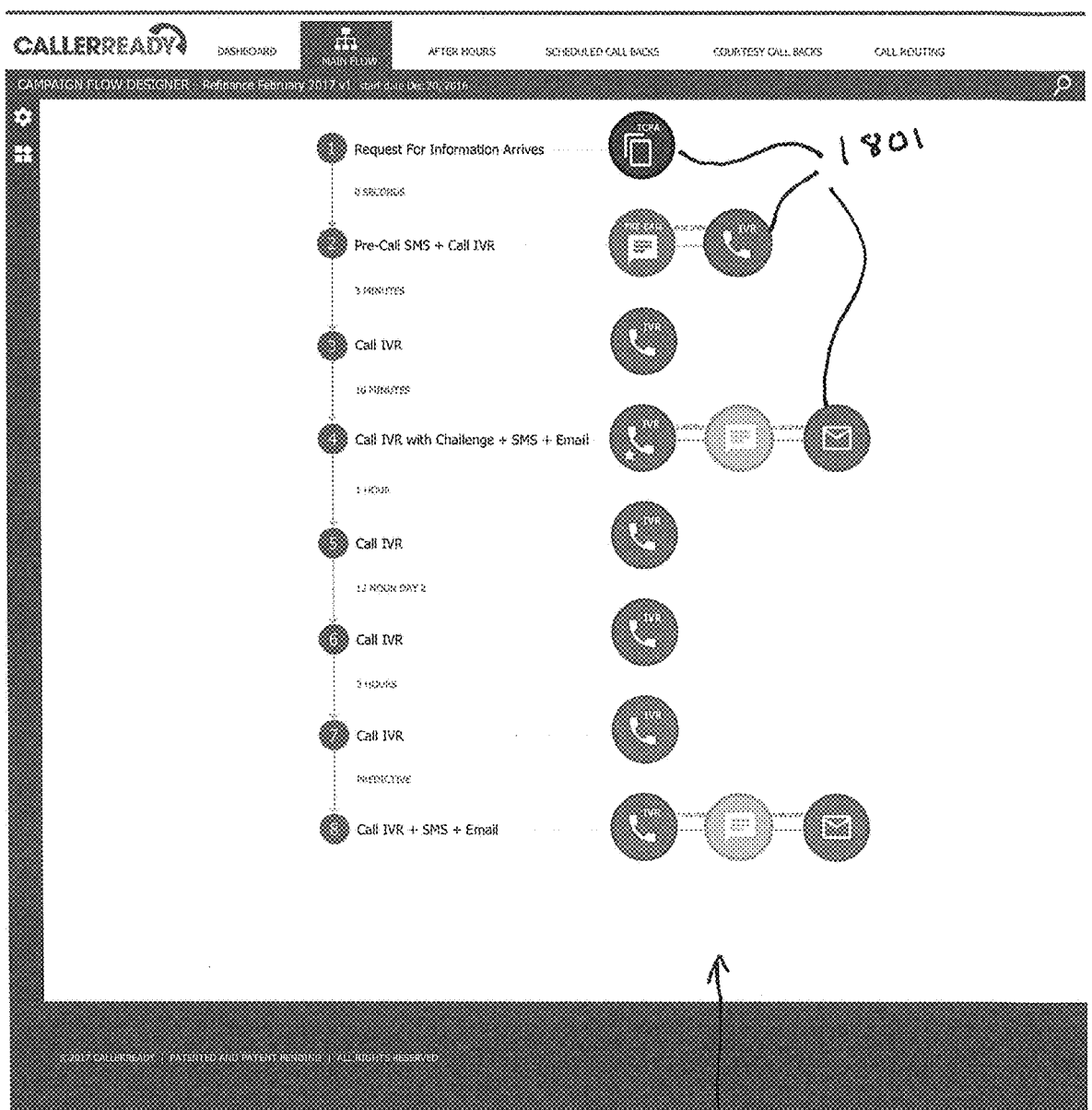
FIG. 18 shows a main flow GUI 1800 according to non-limiting embodiments.

Referring now to FIG. 18, a main flow GUI 1800 is shown according to a non-limiting embodiment. This GUI 1800 shows eight (8) contact attempts in horizontal rows. The vertical lines between each contact attempt illustrates the configured delay (e.g., cadence) between successive contact attempts. The horizontal rows include one or more graphical elements (e.g., icons) 1801 representing the components of the contact attempt. The graphical elements 1801 may represent components that include IVR, text messages (e.g., SMS messages), and email messages, as examples. The graphical elements 1801 may be color coded to distinguish between components, such as a pre-call warming text message and a post-call follow-up text message. The horizontal lines between the icons 1801 represent the delay or lack thereof (e.g., simultaneous) sequencing of the sub-components of each contact attempt. For example, for step 2 (the second horizontal row), the horizontal line between the pre-call warming text message icon and the IVR icon represents a 30-second delay. For step 4 (the fourth horizontal row), the horizontal line between the IVR icon and the text message icon represents a 5-minute delay, and the horizontal line between the text message icon and the email icon represents a 0-second delay (i.e., simultaneous). It will be appreciated that, in other embodiments, the length of the horizontal line and/or other graphical element may visually indicate the length of the delay or lack thereof.

Figure 19:
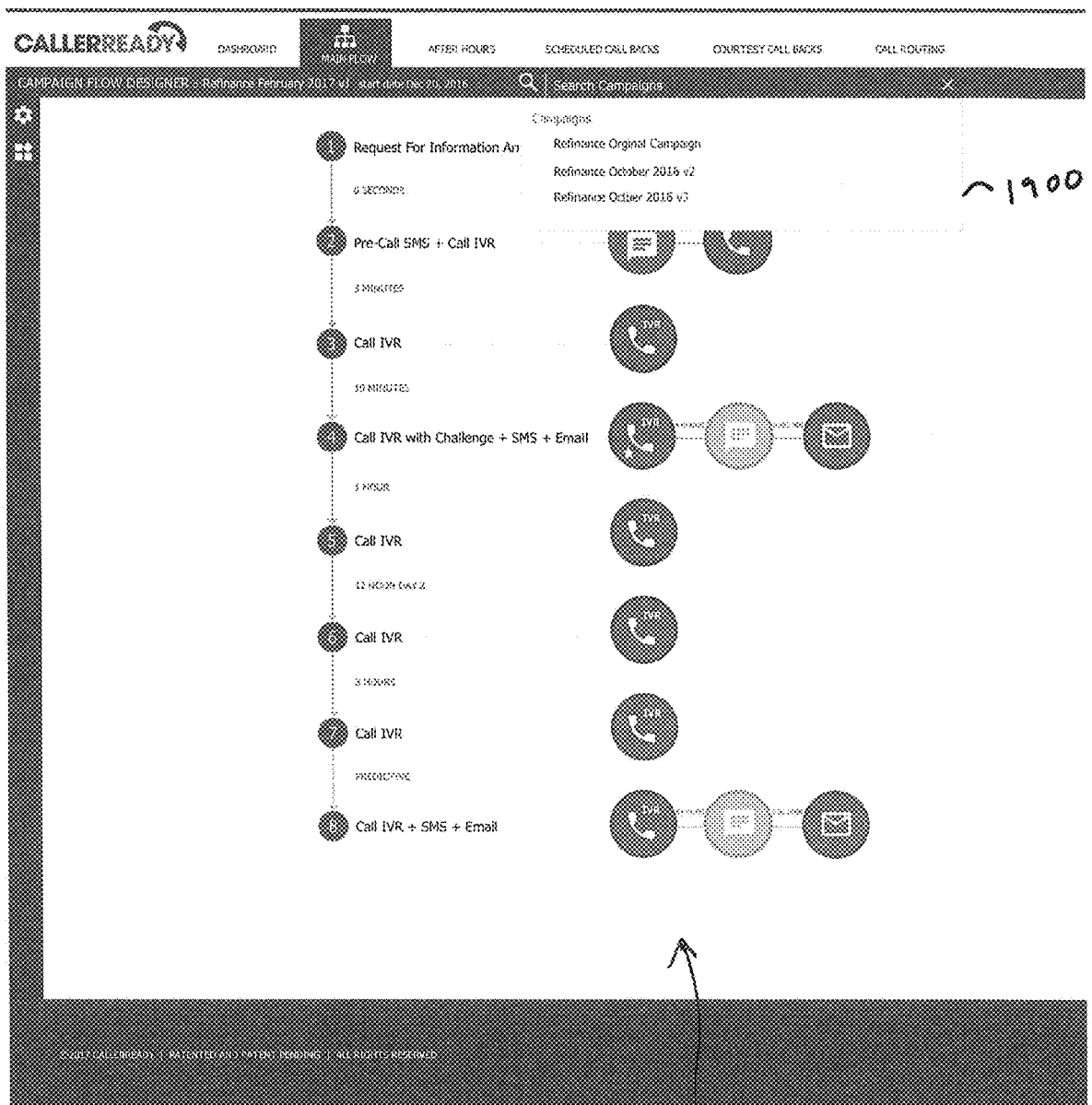
FIG. 19 shows the main flow GUI 1800 from FIG. 18 with a drop-down menu to search other campaigns and/or to select a different campaign according to non-limiting embodiments.

Referring now to FIG. 19, the main flow GUI 1800 is shown with a drop-down menu 1900 configured to search other campaigns and/or to select a different campaign. It will be appreciated that, in addition or alternative to the drop-down menu 1900, one or more other selectable options may be presented. A campaign may represent a main flow design and structure. Campaigns may be predefined, customizable, sharable, and/or the like. In some examples, campaigns may include templates that can be customized and/or modified to fit a particular user's needs. Campaigns may be defined by one or more sets of structured data such as, for example, XML, JSON, or the like.

Figure 20:
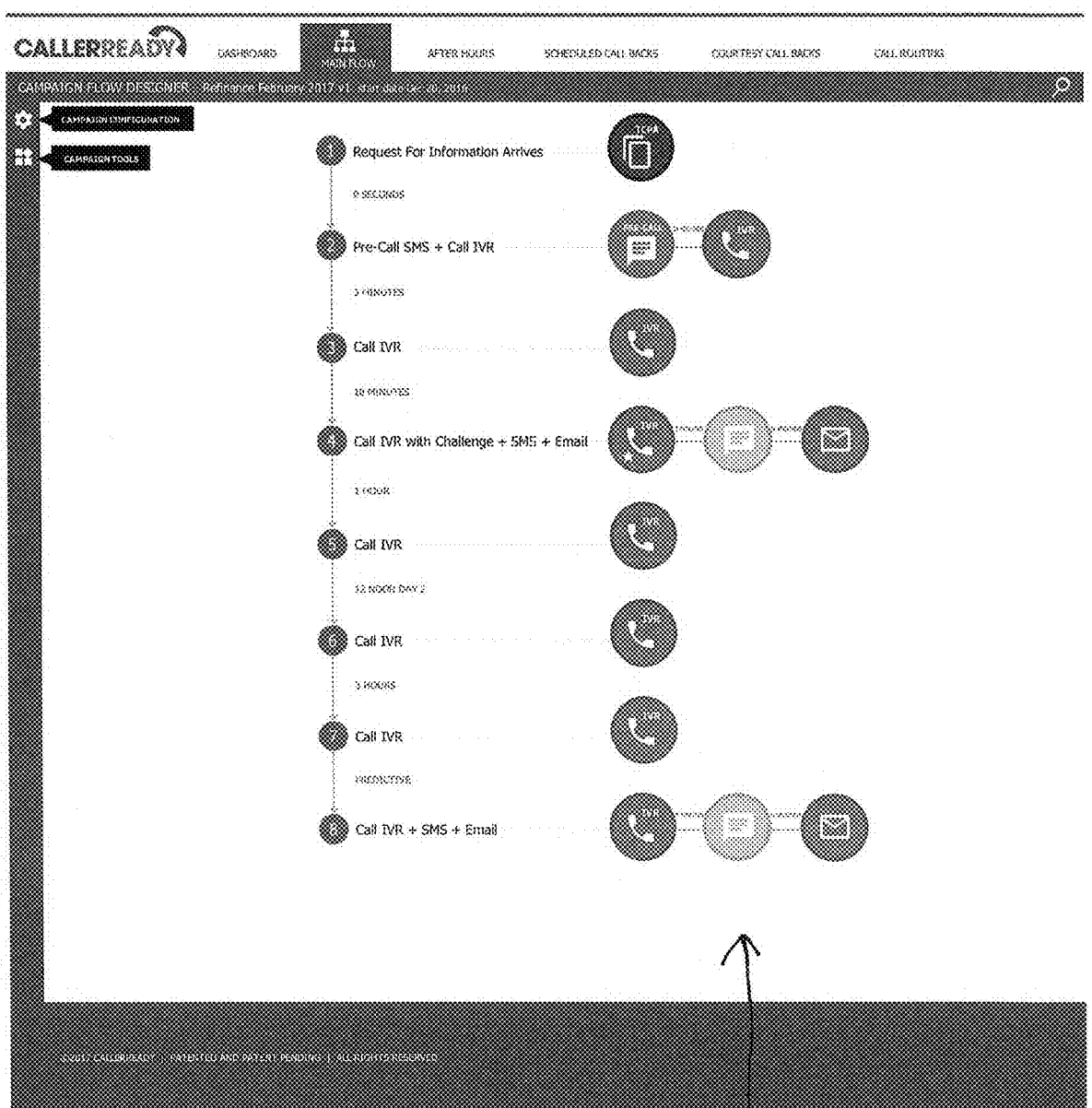
FIG. 20 shows the main flow GUI 1800 from FIG. 18 with identifiers for selectable options to select a campaign configuration GUI or campaign tool GUI according to non-limiting embodiments.

Referring now to FIG. 20, the main flow GUI 1800 is shown with identifiers for selectable options to select a campaign configuration GUI or campaign tool GUI. The campaign configuration GUI may provide additional details and/or selectable options for how the main flow is designed. The campaign tool GUI may include a palette of tools to facilitate a user to design and/or edit the components of the main flow. The palette of tools may include, for example, an icon selection tool, a delay arrangement tool (e.g., configurable horizontal lines), an add/remove row tool, and/or the like.

Figure 21:
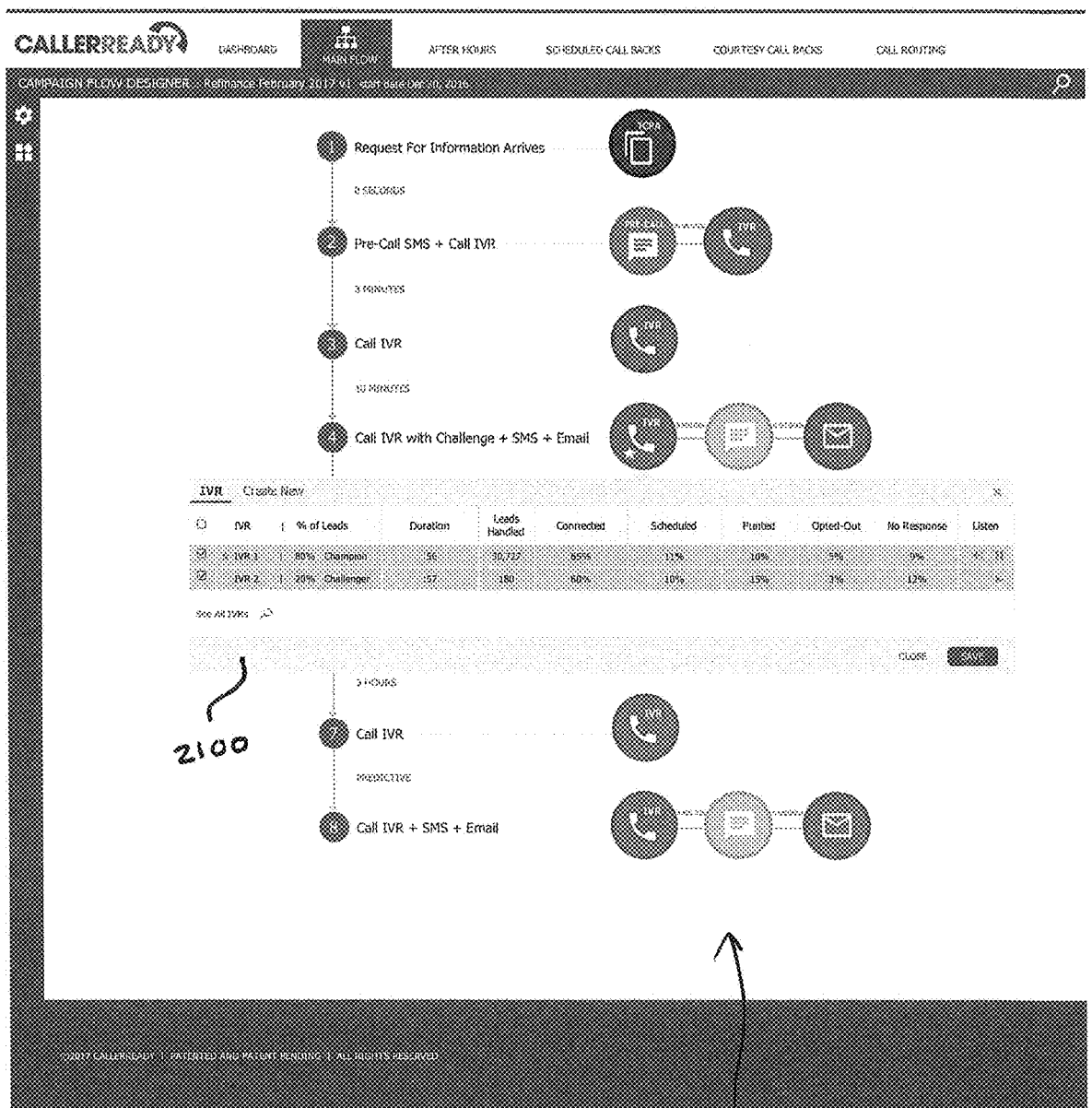
FIG. 21 shows a script testing tool GUI 2100 according to non-limiting embodiments.

Referring now to FIG. 21, a script testing tool GUI 2100 is shown over the main flow GUI 1800. The script testing tool GUI 2100 may be a pop-up window as shown in FIG. 21, a separate pane to the main flow GUI, a drop-down menu, or an entirely separate window or tab. The script testing tool GUI 2100 can be used to compare the relative performance of alternate IVR scripts and alternate prerecorded messages. For example, a user can use the script testing tool GUI 2100 to test one voice talent versus another voice talent. The columns represent the number of leads that a "champion" IVR (e.g., the main IVR being compared) and "challenger" IVRs (e.g., comparison IVRs) have interacted with and the percentage of leads who selected each of the available response options. The available response options may include, for example, delaying the call until later, scheduling a time for a call back, asking to be removed from the list (e.g., added to a do-not-call list), connecting, and receiving no response. The script testing tool GUI 2100, under the "listen" column, also includes selectable options for playing or pausing the IVR playback to hear the contents of the recording.

Figure 22:
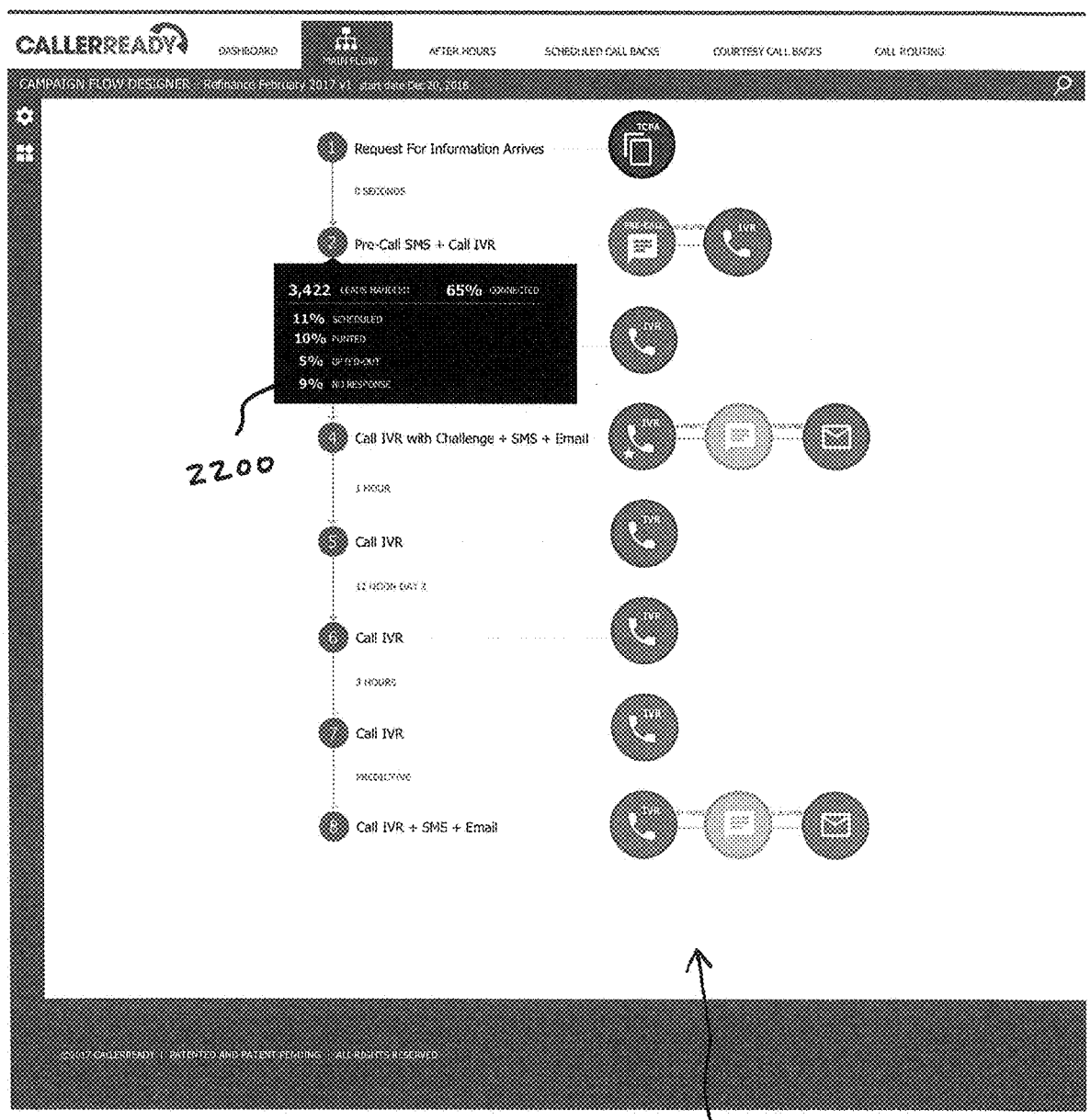
FIG. 22 shows an information window 2200 according to non-limiting embodiments.

Referring now to FIG. 22, an information window 2200 is shown over the main flow GUI 1800. The information window may be presented in response to user selection of a particular contact attempt (e.g., row) of the main flow, and may be a pop-up window as shown in FIG. 22, a separate GUI, a pane to the main flow GUI 1800, and/or the like. The information window 2200 shown in FIG. 22 shows the number of leads processed and the percentage distribution of outcomes from the particular contact attempt (e.g., percent connected, percent scheduled for another time, percent delayed (e.g., "punted"), percent opted-out (e.g., do-not-call), and percent with no response). It will be appreciated that various other statistics about the specific contact attempt may also be shown in addition to filters for viewing statistics over a particular period of time or by other parameters.

Figure 23:
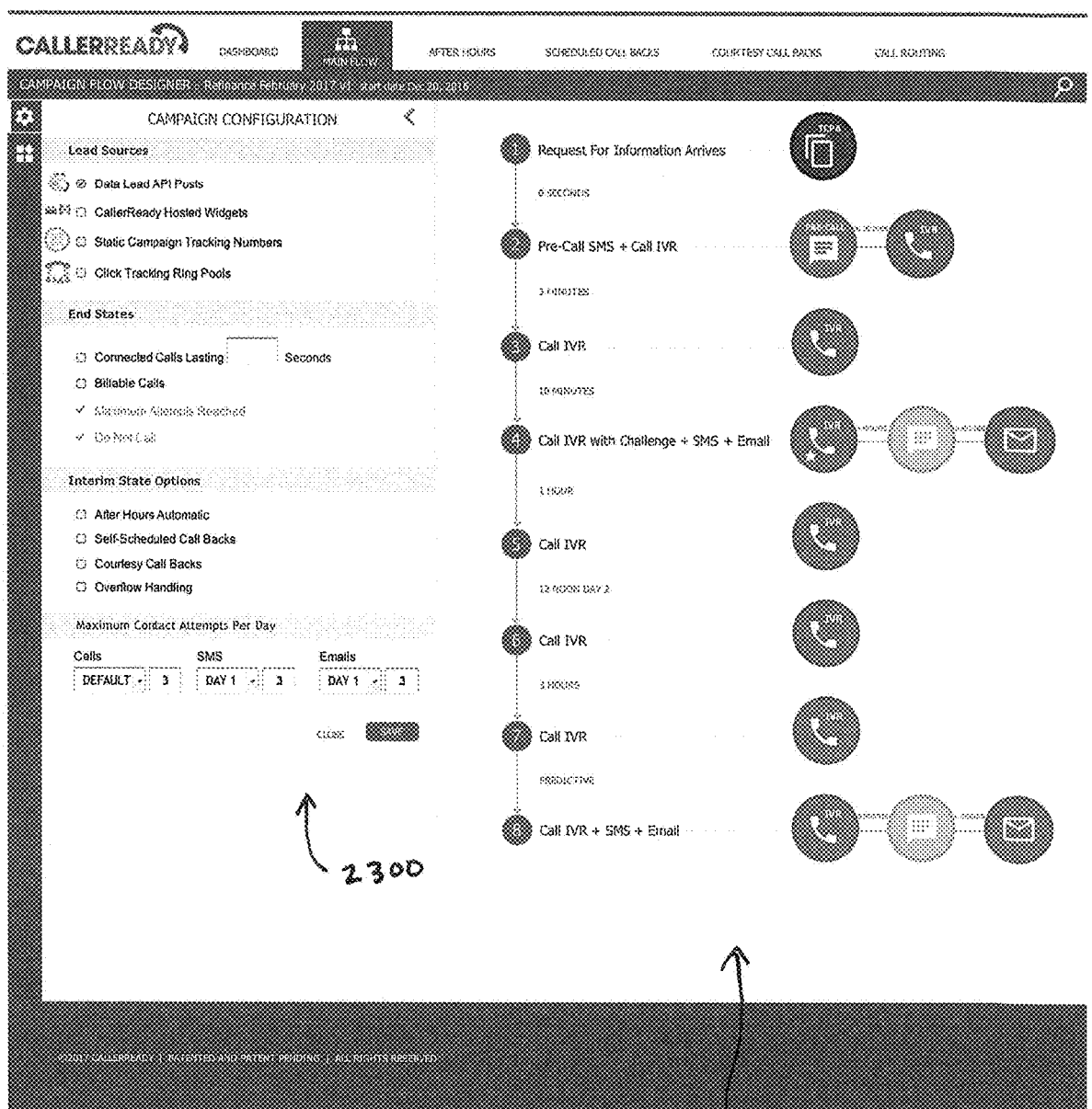
FIG. 23 shows a campaign configuration GUI 2300 according to non-limiting embodiments.

Referring now to FIG. 23, a campaign configuration GUI 2300 is shown next to the main flow GUI 1800. The campaign configuration GUI 2300 may be displayed in response to user selection of a campaign configuration selectable option, as explained in connection with FIG. 20. The campaign configuration GUI 2300 is shown as a pane of the main flow GUI 1800, although it will be appreciated that it may be an entirely separate GUI, a pop-up window, and/or the like. The campaign configuration GUI 2300 includes tools and other selectable options for editing lead sources, end-states, and interim state options. For example, one or more lead sources may be selected from the displayed options for the particular campaign being edited or viewed. A user may also configure end states to determine when to stop the contact attempt flow. For example, an end state may include a connected call lasting a minimum duration, reaching a billable duration or threshold, and/or the like. The interim state options allow for a user to select various sub-process flows, including after-hours flows, courtesy call-back flows, scheduled call-back flows, and overflow call handling flows. The campaign configuration GUI 2300 also includes selectable options for providing a user with the ability to set the maximum outreach efforts made to a given lead per day and includes the ability to vary the maximums on any given day. In this manner, the campaign designer can specify the maximum number of calls, emails, and text messages per day. A default option may be provided so that, if a particular day is not specified, the default daily limits are used.

Figure 24:
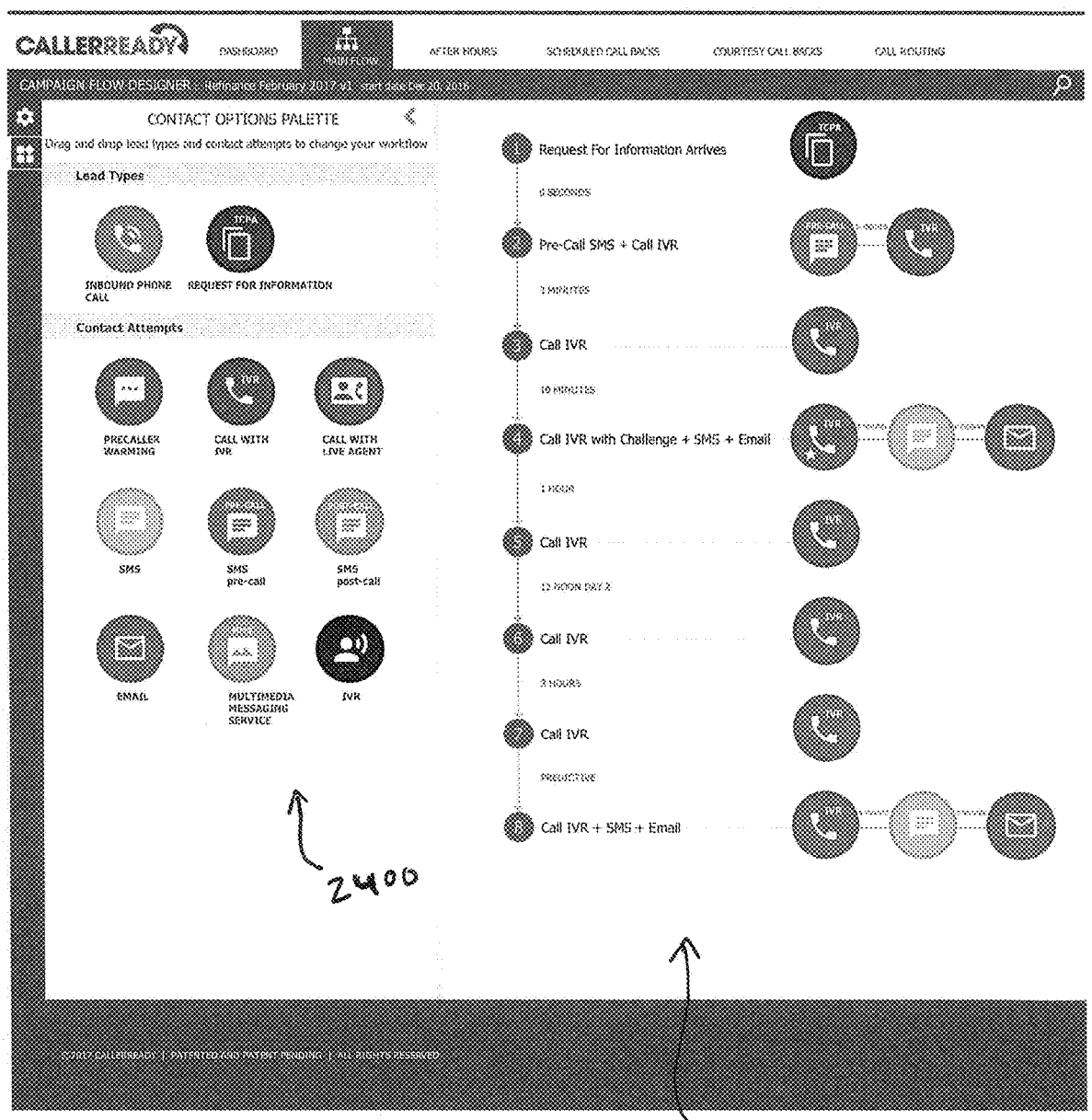
FIG. 24 shows a campaign tools GUI 2400 according to non-limiting embodiments.

Referring now to FIG. 24, a campaign tools GUI 2400 is shown next to the main flow GUI 1800. The campaign tools GUI 2400 may be displayed in response to user selection of a campaign tools selectable option, as explained in connection with FIG. 20. The campaign tools GUI 2400 is shown as a pane of the main flow GUI 1800, although it will be appreciated that it may be an entirely separate GUI, a pop-up window, and/or the like. The campaign tools GUI 2400 includes a palette including various icons that can be selected by a user to build and modify the elements of the main flow for contact attempts shown in the main flow GUI 1800.

Figure 25:
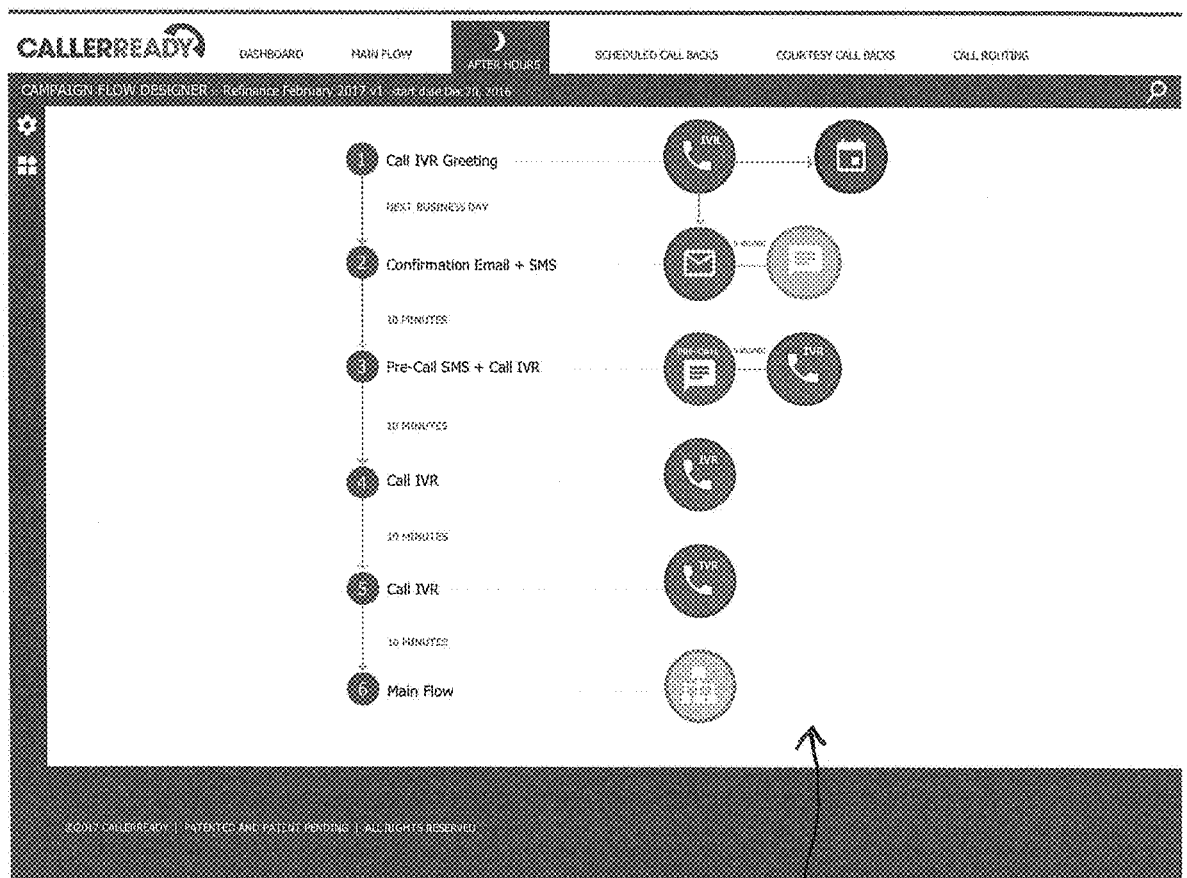
FIG. 25 shows an after-hours sub-process flow GUI 2500 according to non-limiting embodiments.

Referring now to FIG. 25, an after-hours sub-process flow GUI 2500 is shown according to a non-limiting embodiment. The after-hours sub-process flow may be the contact flow that is used within certain predefined times (e.g., after designated business hours). The times may be configured by the user and the campaign configuration GUI 2300 and/or campaign tools GUI 2400 shown in FIGS. 23 and 24 may be used to design, modify, and/or configure the after-hours sub-process flow.

Figure 26:
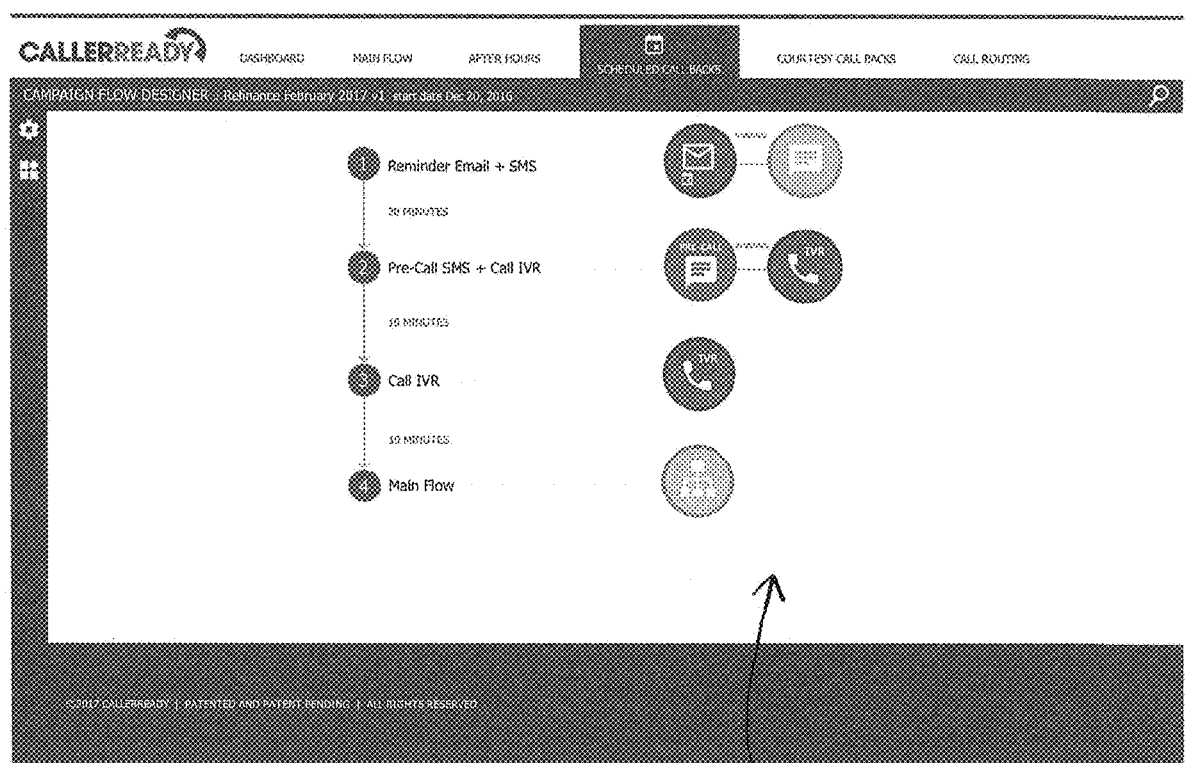
FIG. 26 shows a scheduled call sub-process flow GUI 2600 according to non-limiting embodiments.

Referring now to FIG. 26, a scheduled call sub-process flow GUI 2600 is shown according to a non-limiting embodiment. The scheduled call sub-process flow GUI 2600 may be the contact flow that is used when a call is scheduled between a lead and a call agent. When the scheduled call sub-process flow ends without the lead having entered a final (e.g., ending) state or another interim process flow (e.g., sub-process flow), the main contact attempt flow may be returned to utilized again for contacting the lead.

Figure 27:
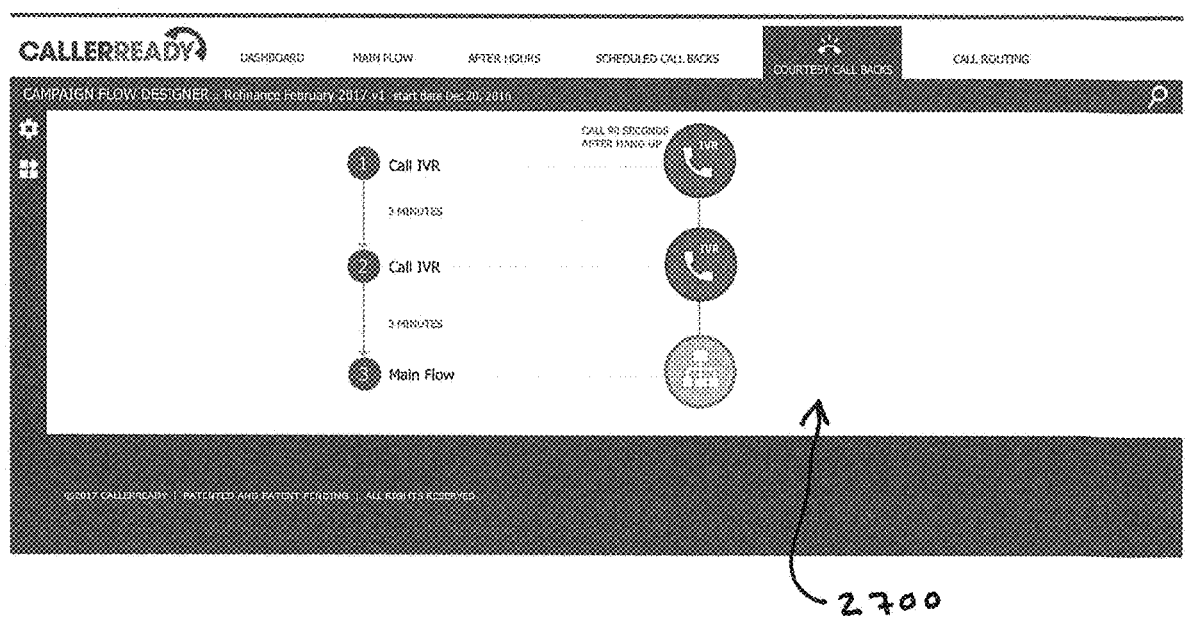
FIG. 27 shows a courtesy call-back sub-process flow GUI 2700 according to non-limiting embodiments.

Referring now to FIG. 27, a courtesy call-back sub-process flow GUI 2700 is shown according to a non-limiting embodiment. The courtesy call-back sub-process flow GUI 2700 may be the contact flow that is used when a lead is called back. When the courtesy call-back sub-process flow ends without the lead having entered an end-state or another interim process flow (e.g., sub-process flow), the main contact attempt flow may be returned to and utilized again for automatically attempting to contact the lead. A courtesy call-back may include a short call courtesy call-back or a long call courtesy call-back. A short call courtesy call-back sub-process flow may be initiated in response to determining that a previous call was shorter than expected (e.g., the previous call duration failed to satisfy a minimum threshold), which may be a result of an accidentally dropped or disconnected call. A long call courtesy call-back sub-process flow may be initiated in response to determining that the lead spoke with a service provider for at least a threshold duration but that no sale was finalized. A short call courtesy call-back sub-process may be initiated soon after the previous call (e.g., within 30 seconds to a minute) and a long call courtesy call-back sub-process may be initiated after a longer duration passes since the previous call (e.g., within several minutes or a day). It will be appreciated that various implementations are possible.

Figure 28:
FIG. 28 shows a call routing management GUI 2800 according to non-limiting embodiments.

Referring now to FIG. 28, a call routing management GUI 2800 is shown according to a non-limiting embodiment. The call routing management GUI 2800 includes several selectable options for configuring call routing for both connected calls and overflow handling. Through the call routing management GUI 2800, a user can specify an entity or agent to call once a lead is ready to speak with a service representative. In non-limiting embodiments, the call routing management GUI 2800 may be color coded. For example, each routing location name (e.g., the entity or agent) may be colored green, yellow, or red, where green indicates that the associated entity or agent is cleared for additional calls, yellow indicates that the associated entity or agent is close to an order maximum or a call maximum, and red indicates that the associated entity or agent is unable to receive calls. Various states may also be represented with emojis, labels, or the like.

Figure 29:
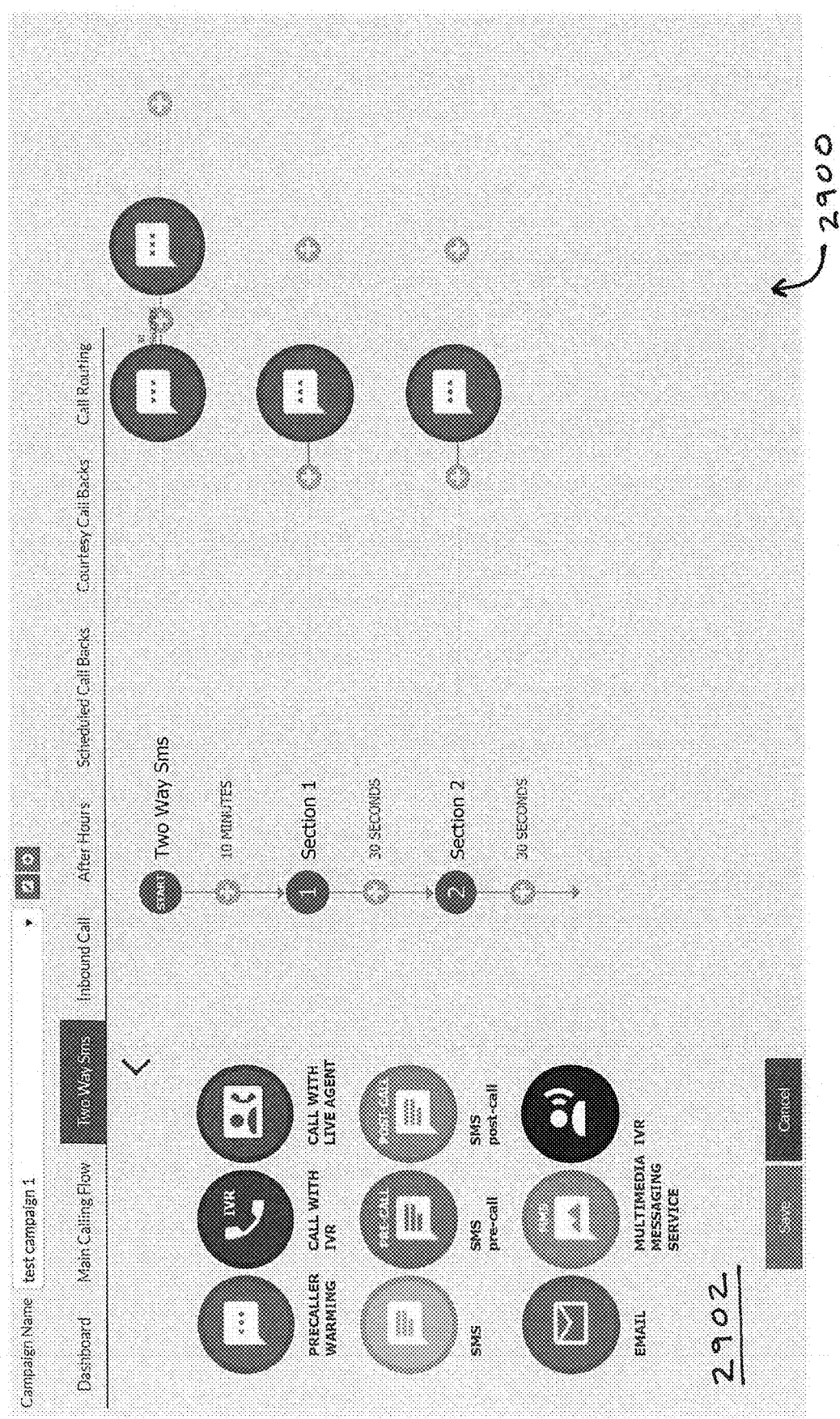
FIG. 29 shows a two-way conversational text message automation management GUI 2900 according to non-limiting embodiments.

Referring now to FIG. 29, a two-way conversational text message automation management GUI 2900 is shown according to a non-limiting embodiment. The two-way conversational text message automation management GUI 2900 includes a tools GUI 2902 including a palette with various icons that can be selected by a user to build and modify the elements of the flow for two-way text messages shown in the two-way conversational text message automation management GUI 2900. The two-way conversational text message automation management GUI 2900 allows for a user to build and modify an automatic flow for two-way text messages by specifying time periods between messages and other parameters. In non-limiting embodiments, artificial intelligence and predictive modeling may be employed to automate a conversation between a bot and a user. Although the tools GUI 2902 is shown as a pane of the two-way conversational text message automation management GUI 2900, it will be appreciated that it may be an entirely separate GUI, a pop-up window, and/or the like.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A computer-implemented method for automating calls from a call center to a lead, comprising:
    identifying, with at least one processor, the lead;
    determining, with at least one processor, a number of automated contact attempts to be made for contacting the lead based at least partially on at least one rule, the number of automated contact attempts to be made comprising a plurality of contact attempts including a first contact attempt and a nth contact attempt, wherein n is greater than 2 and less than the number of contact attempts to be made;
    for at least the first contact attempt and the nth contact attempt, determining, with at least one processor, a predicted optimal time for the contact attempt to be made based at least partially on a predictive model configured to generate the predicted optimal time for the contact attempt based on historical call attempts to the lead and/or lead data associated with the lead;
    initiating, with at least one processor, the first contact attempt to the lead at the predicted optimal time for the first contact attempt; and
    initiating, with at least one processor, the nth contact attempt to the lead at the predicted optimal time for the nth contact attempt.

2. The computer-implemented method of claim 1, wherein the first contact attempt comprises a text message.

3. The computer-implemented method of claim 2, wherein the text message is at least one of the following: a Short Message Service (SMS) message, a Multimedia Message Service (MMS) message, an email message, a web-based message, or any combination thereof.

4. The computer-implemented method of claim 2, wherein the text message comprises a text message body, and wherein the text message body comprises a call time and a service provider telephone number.

5. The computer-implemented method of claim 2, further comprising:
    receiving a response to the text message; and
    in response to receiving the response to the text message, generating a new text message configured to prompt a user to choose or confirm a call time.

6. The computer-implemented method of claim 5, wherein the text message comprises a prompt to input or confirm lead data, and wherein the new text message is generated in response to receiving lead data or a confirmation of lead data.

7. The computer-implemented method of claim 2, wherein the text message comprises a time that a contact attempt of the plurality of contact attempts will be initiated.

8. The computer-implemented method of claim 7, wherein the nth contact attempt comprises another text message comprising a next time that a next contact attempt of the plurality of contact attempts will be initiated.

9. The computer-implemented method of claim 1, wherein the predicted optimal time for the nth contact attempt is further modified based on historical call attempts to the lead and/or lead data associated with the lead.

10. A system for automating calls from a call center to a lead, comprising at least one processor programmed or configured to:
identify the lead;
determine a number of automated contact attempts to be made for contacting the lead based at least partially on at least one rule, the number of automated contact attempts to be made comprising a plurality of contact attempts including a first contact attempt and a nth contact attempt, wherein n is greater than 2 and less than the number of contact attempts to be made;
for at least the first contact attempt and the nth contact attempt, determine a predicted optimal time for the contact attempt based at least partially on a predictive model configured to generate the predicted optimal time for the contact attempt based on historical call attempts to the lead and/or lead data associated with the lead;
initiate the first contact attempt to the lead at the predicted optimal time for the first contact attempt; and
initiate the nth contact attempt to the lead at the predicted optimal time for the nth contact attempt.

11. The system of claim 10, wherein the first contact attempt comprises a text message.

12. The system of claim 11, wherein the text message is at least one of the following: a Short Message Service (SMS) message, a Multimedia Message Service (MMS) message, an email message, a web-based message, or any combination thereof.

13. The system of claim 11, wherein the text message comprises a text message body, and wherein the text message body comprises a call time and a service provider telephone number.

14. The system of claim 11, wherein the at least one processor is further programmed or configured to:
receive a response to the text message; and
in response to receiving the response to the text message, generate a new text message configured to prompt a user to choose or confirm a call time.

15. The system of claim 14, wherein the text message comprises a prompt to input or confirm lead data, and wherein the new text message is generated in response to receiving lead data or a confirmation of lead data.

16. The system of claim 11, wherein the text message comprises a time that a contact attempt of the plurality of contact attempts will be initiated.

17. The system of claim 16, wherein the nth contact attempt comprises another text message comprising a next time that a next contact attempt of the plurality of contact attempts will be initiated.

18. The system of claim 10, wherein the predicted optimal time for the nth contact attempt is further modified based on historical call attempts to the lead and/or lead data associate with the lead.

19. A computer program product for automating calls from a call center to a lead, comprising at least one non-transitory computer-readable medium including program instructions that, when executed by at least one processor, cause the at least one processor to:
identify the lead;
determine a number of automated contact attempts to be made for contacting the lead based at least partially on at least one rule, the number of automated contact attempts to be made comprising a plurality of contact attempts including a first contact attempt and a nth contact attempt, wherein n is greater than 2 and less than the number of contact attempts to be made;
for at least the first contact attempt and the nth contact attempt, determine a predicted optimal time for the contact attempt to be made based at least partially on a predictive model configured to generate the predicted optimal time for the contact attempt based on historical call attempts to the lead and/or lead data associated with the lead;
initiate the first contact attempt to the lead at the predicted optimal time for the first contact attempt; and
initiate the nth contact attempt to the lead at the predicted optimal time for the nth contact attempt.

20. The computer program product of claim 19, wherein the predicted optimal time for the nth contact attempt is further modified based on historical call attempts to the lead and/or lead data associated with the lead.

* * * * *

UNITED STATES PATENT AND TRADEMARK OFFICE
CERTIFICATE OF CORRECTION

PATENT NO. : 10,694,039 B2
APPLICATION NO. : 15/687811
DATED : June 23, 2020
INVENTOR(S) : Joseph Charlson It is certified that error appears in the above-identified patent and that said Letters Patent is hereby corrected as shown below:

On the Title Page

Column 1, Line 2, delete "which is" and insert -- and --

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*